United States Patent
Yoshida

(10) Patent No.: US 8,140,546 B2
(45) Date of Patent: Mar. 20, 2012

(54) COMPUTER SYSTEM FOR PERFORMING AGGREGATION OF TREE-STRUCTURED DATA, AND METHOD AND COMPUTER PROGRAM PRODUCT THEREFOR

(75) Inventor: Issei Yoshida, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/477,975

(22) Filed: Jun. 4, 2009

(65) Prior Publication Data

US 2009/0307214 A1    Dec. 10, 2009

(30) Foreign Application Priority Data

Jun. 6, 2008  (JP) ................. 2008-148798

(51) Int. Cl.
    *G06F 17/30* (2006.01)
(52) U.S. Cl. .......... 707/752; 707/786; 707/715
(58) Field of Classification Search .......... 707/752, 707/753, 786, 715
    See application file for complete search history.

(56) References Cited

U.S. PATENT DOCUMENTS

| | | | |
|---|---|---|---|
| 7,287,033 B2 | 10/2007 | Shadmon et al. | |
| 7,330,848 B2 | 2/2008 | Chaudhuri et al. | |
| 2005/0055355 A1* | 3/2005 | Murthy et al. | 707/100 |
| 2006/0085561 A1* | 4/2006 | Manasse et al. | 709/247 |

FOREIGN PATENT DOCUMENTS

JP    2007 156739 A2    6/2007

OTHER PUBLICATIONS

Abadi et al. "Scalable Semantic Web Data Management Using Vertical Partitioning," VLDB '07, Sep. 23-28, 2007, Vienna, Austria, pp. 411-422.
Yoshikawa, et al., XRel: a path-based approach to storage and retrieval of XML documents using relational databases, presented at ACM Trans. Internet Techn., 2001, pp. 110-141.
http://en.wikipedia.org/wiki/Resource_Description_Framework
"Resource Description Framework" from the Wikipedia, ver. Mar. 17, 2009, pp. 2-12.

* cited by examiner

*Primary Examiner* — Cheryl Lewis
*Assistant Examiner* — Nan Hutton
(74) *Attorney, Agent, or Firm* — Vazken Alexanian

(57) ABSTRACT

A computer system, methods, and programs for creating an index for aggregating data in at least one tree structure including at least one node each including one label indicating node type and values. The system includes a node ID assignment processing unit for assigning IDs to the nodes in a post order; first, second, and third index creation processing units. The first unit creates a first index having one or more sets of data including the node ID and values included in the node; the second unit creates a second index having one or more sets of data including node ID and ID of a descendant node having the minimum ID; and the third unit creates a third index having one or more sets of data including IDs of one or more nodes having specific values.

23 Claims, 25 Drawing Sheets

300

| VALUE | FREQUENCY |
|---|---|
| Internet | 2 |
| modem | 2 |
| phone | 2 |
| pc | 1 |

301

| VALUE | FREQUENCY |
|---|---|
| Internet | 3 |
| phone | 2 |
| modem | 1 |
| pc | 1 |

302

| VALUE | FREQUENCY |
|---|---|
| Internet | 1 |
| modem | 1 |

FIG. 3

| SECTION | UNCOMPRESSED INDEX FILE SIZE (A) | COMPRESSED INDEX FILE SIZE (B) | COMPRESSION RATIO (%) ((B/A*100) |
|---|---|---|---|
| Time to solve the problem | 3,896,124 | 1,885,513 | 48.4 |
| Proper Noun | 10,332,660 | 5,325,410 | 51.5 |
| Common Noun | 18,900,872 | 10,019,374 | 53.0 |
| Person Name | 107,752 | 68,402 | 63.5 |
| Date | 3,896,124 | 2,516,857 | 64.6 |

FIG. 5B

| SECTION | Entry[1] | | | Entry[2] | | | Entry[3] | | | Entry[4] | | |
|---|---|---|---|---|---|---|---|---|---|---|---|---|
| | NODE ID | NUMBER OF VALUES | VALUES | NODE ID | NUMBER OF VALUES | VALUES | NODE ID | NUMBER OF VALUES | VALUES | NODE ID | NUMBER OF VALUES | VALUES |
| Noun | 2 | 3 | Internet pc phone | 5 | 2 | Internet phone | 9 | 2 | Internet modem | 11 | 2 | Internet modem |
| Verb | 3 | 2 | connect type | 13 | 2 | connect read | | | | | | |

| SECTION | Entry[1] | | Entry[2] | | Entry[3] | |
| --- | --- | --- | --- | --- | --- | --- |
| | NODE ID | MINIMUM NODE ID | NODE ID | MINIMUM NODE ID | NODE ID | MINIMUM NODE ID |
| Document | 7 | 1 | 15 | 8 | | |
| Question | 4 | 2 | 10 | 9 | 12 | 11 |
| Answer | 6 | 5 | 14 | 13 | | |

| VALUE | NODE ID | NODE ID | NODE ID | NODE ID |
|---|---|---|---|---|
| Internet | 2 | 5 | 9 | 11 |
| PC | 2 | | | |
| modem | 5 | 11 | | |
| phone | 2 | 9 | | |

FIG. 7B

| NODE ID | VALUE |
|---|---|
| 2 | Internet, PC, phone |
| 5 | Internet, modem |
| 9 | Internet, phone |
| 11 | Internet, modem, keyboard |

840

| NODE ID | NODE ID |
|---|---|
| Internet | 2, 5, 9, 11 |
| keyboard | 11 |
| modem | 5, 11 |
| PC | 2 |
| phone | 2, 9 |

841

| ROW SIZE | N1:NUMBER OF NODES | Entry[1] | Entry[2] | ... | Entry[N1] |
| ROW SIZE | N2:NUMBER OF NODES | Entry[1] | ... | Entry[N2] | |
| ... | ... | ... | ... | ... | ... |

950

951

| UNIT ID | POINTER |
|---|---|
| Uid[1] | Pointer[1] |
| Uid[2] | Pointer[2] |
| : | : |
| Uid[N1] | Pointer[N1] |

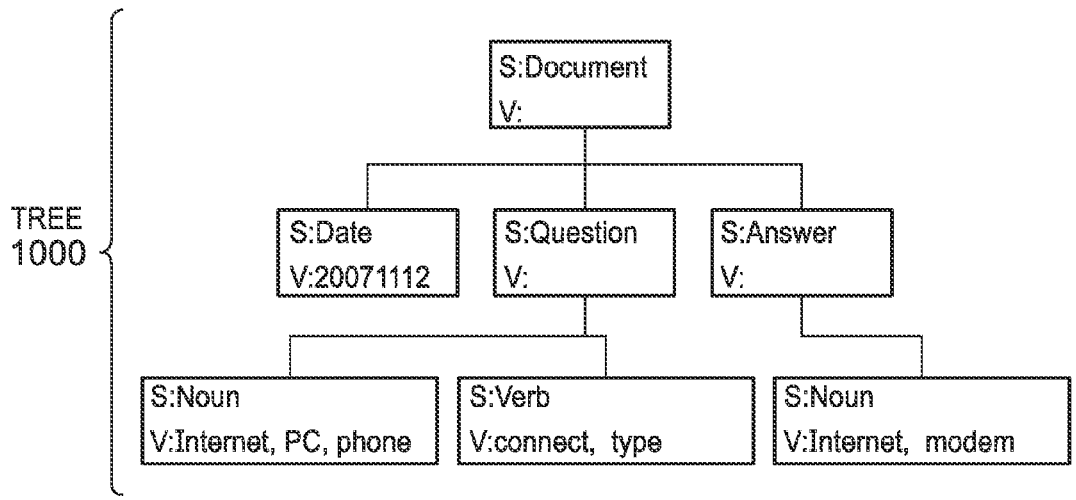

FIG. 10A

| QUERY NUMBER | QUERY CONTENT |
|---|---|
| Q1 | COUNT VALUES OF "Noun" IN UNTIS OF "Document" |
| Q2-1<br>Q2-2<br>Q2-3<br>Q2-4 | COUNT VALUES OF "Noun" IN UNTIS OF "Document" FOR "Document" INCLUDING KEYWORD v OF "Noun" IN SOME PLACE IN "Document" (VALUES DIFFERENT FOR DIFFERENT QUERIES ARE USED FOR v) |
| Q3-1<br>Q3-2<br>Q3-3<br>Q3-4 | COUNT VALUES OF "Noun" IN UNTIS OF "Answer" FOR "Document" INCLUDING KEYWORD v OF "Noun" IN SOME PLACE IN "Question" (VALUES DIFFERENT FOR DIFFERENT QUERIES ARE USED FOR v) |

FIG. 10B

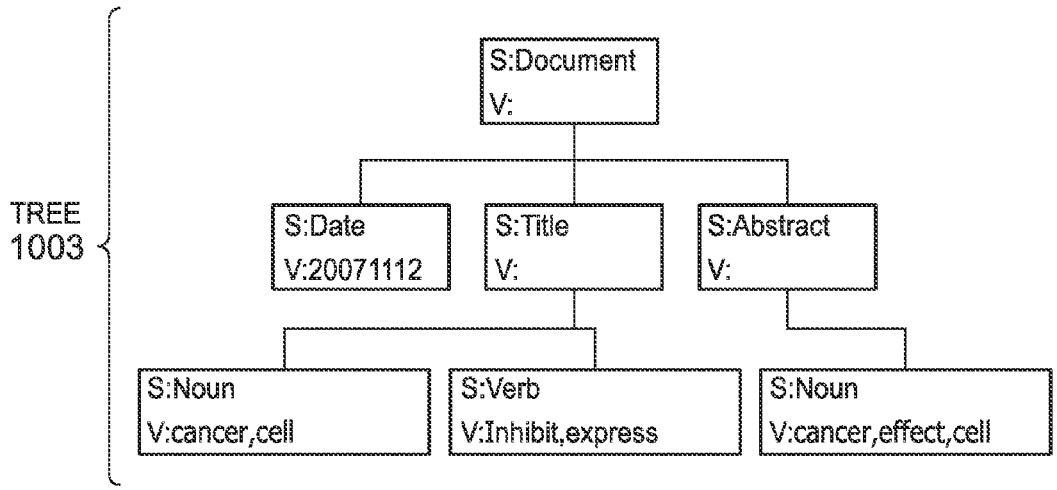

FIG. 10D

| QUERY NUMBER | QUERY CONTENT |
|---|---|
| Q1 | COUNT VALUES OF "Noun" IN UNTIS OF "Document" |
| Q2-1 Q2-2 Q2-3 Q2-4 | COUNT VALUES OF "Noun" IN UNTIS OF "Document" FOR "Document" INCLUDING KEYWORD v OF "Noun" IN SOME PLACE IN "Document" (VALUES DIFFERENT FOR DIFFERENT QUERIES ARE USED FOR v) |
| Q3-1 Q3-2 Q3-3 Q3-4 | COUNT VALUES OF "Noun" IN UNTIS OF "AbstractText" FOR "Document" INCLUDING KEYWORD v OF "Noun" IN SOME PLACE IN "Title" (VALUES DIFFERENT FOR DIFFERENT QUERIES ARE USED FOR v) |

| DATA | PostgreSQL | SAWAN |
|---|---|---|
| LOG DATA OF CALL CENTER | 1.2 HOURS | 0.2 HOURS |
| DATA OF LIFE SCIENCE | 13 HOURS | 4.5 HOURS |

FIG. 10G

COMPUTER SYSTEM FOR PERFORMING AGGREGATION OF TREE-STRUCTURED DATA, AND METHOD AND COMPUTER PROGRAM PRODUCT THEREFOR

CROSS-REFERENCE TO RELATED APPLICATION

This application claims priority under 35 U.S.C. §119 from Japanese Patent Application No. 2008-148798 filed on Jun. 6, 2008, the entire contents of which are incorporated herein by reference.

BACKGROUND OF THE INVENTION

1. Field of the Invention

The present invention relates to a computer system, method, and computer program for aggregation of tree-structured data, and more particularly to a computer system, method, and computer program for creating an index for aggregation of tree-structured data.

2. Description of Related Art

In various search and database fields, there are operations performed for counting values by using an aggregate function in addition to "GROUP BY" and "HAVING" in a relational database (RDB). To perform the counting efficiently, a variety of indices and data formats have been suggested.

Conventional techniques have been successful in general-purpose search and aggregation. In these techniques, however, redundant data is maintained for aggregation. Therefore, the techniques have problems in performance for massive data quantities. Moreover, regarding aggregation using a B-tree (B+-tree) typical in RDB, the conventional techniques have a problem of slow processing in the case of a loose search condition such as, for example, a case where 50 percent of the data is a target of the counting.

Patent Document 1, U.S. Pat. No. 7,287,033, discloses an index structure that is a combination of two types of existing tree-structure indices such as "Layered Index" and "Patricia Tree." The index structure, however, is unsuitable for the case where there is a need for processing a large number of nodes, although it is effective in narrowing down the number of nodes for a search. Furthermore, a technique disclosed in Patent Document 2, U.S. Pat. No. 7,330,848, uses the data format of a conventional RDB. In view of the above description, it is apparent that there is a need for a technique for counting values efficiently in various search and database fields.

SUMMARY OF THE INVENTION

According to an aspect of the present invention, a computer system for creating an index to aggregate data in at least one tree structure including at least one node, in which each of the nodes includes one label indicating the type of the node and zero or more values is provided. The computer system includes:

a node ID assignment processing unit for assigning node IDs to the nodes in a post order;

a first index creation processing unit for creating a first index having one or more sets of data including the node ID of each of the nodes and the values included in the node, wherein the one or more sets of data are generated for each of the labels;

a second index creation processing unit for creating a second index having one or more sets of data including the node ID of each of the nodes and the node ID of a descendant node having the minimum node ID among at least one descendant node of the node, wherein the one or more sets of data are generated for each of the labels; and a third index creation processing unit for creating a third index having one or more sets of data including the node IDs of one or more nodes including specific values, wherein the one or more sets of data are generated for each of the specific values for each of the labels.

According to another aspect of the present invention, a computer system for aggregating data in at least one tree structure including at least one node, in which each of the nodes includes one label indicating the type of the node and zero or more values and node IDs are assigned to the nodes in a post order is provided. The computer system includes:

a receiving processing unit for receiving a search formula for performing the aggregation;

a first list acquisition processing unit for acquiring a first list including node IDs of one or more nodes each having a value which is a search target of the search formula by using the value which is the search target of the search formula and by using an index having one or more sets of data including the node IDs of the one or more nodes including specific values, wherein the one or more sets of data are generated for each of the specific values for each of the labels;

a second list acquisition processing unit for acquiring a second list including one or more root node IDs of root nodes in tree structures having one or more descendant nodes each having the value which is the search target of the search formula by using the acquired first list and by using an index having one or more sets of data including the node ID of each of the nodes and the node ID of a descendant node having the minimum node ID among at least one descendant node of the node, wherein the one or more sets of data are generated for each of the labels; and a search processing unit for searching for the value which is the search target of the search formula on the basis of the acquired second list, wherein the value which is the search target of the search formula corresponds to at least one keyword.

According to yet another aspect of the present invention, a method of creating an index for aggregating data in at least one tree structure including at least one node in which each of the nodes includes one label indicating the type of the node and zero or more values, in a computer system having a central processing unit, a memory, and a storage unit for storing tree-structured data is provided. The method includes the steps of:

reading information of the nodes into the memory and assigning node IDs to the nodes whose information has been read in a post order;

creating a first index having one or more sets of data including the node ID of each of the nodes and the values included in the node;

storing the created first index into the storage unit, wherein the one or more sets of data are generated for each of the labels;

creating a second index having one or more sets of data including the node ID of each of the nodes and the node ID of a descendant node having the minimum node ID among at least one descendant node of the node;

storing the created second index into the storage unit, wherein the one or more sets of data are generated for each of the labels;

creating a third index having one or more sets of data including node IDs of one or more nodes including specific values; and storing the created third index into the storage unit, wherein the one or more sets of data are generated for each of the specific values for each of the labels, wherein the steps are performed by the central processing unit.

According to still another aspect of the present invention, a method of aggregating data in at least one tree structure including at least one node, in which each of the nodes includes one label indicating the type of the node and zero or more values and node IDs are assigned to the nodes, in a computer system having a central processing unit, a memory, and a storage unit for storing tree-structured data in a post order is provided. The method includes the steps of:

receiving a search formula for performing the aggregation and storing the received search formula into the memory;

acquiring a first list including node IDs of one or more nodes each having a value which is a search target of the search formula by using the value which is the search target of the search formula and by using an index having one or more sets of data including the node IDs of the one or more nodes including specific values;

storing the acquired first list into the storage unit, wherein the one or more sets of data are generated for each of the specific values for each of the labels;

acquiring a second list including one or more root node IDs of root nodes in tree structures having one or more descendant nodes each having the value which is the search target of the search formula by using the acquired first list and by using an index having one or more sets of data including the node ID of each of the nodes and the node ID of a descendant node having the minimum node ID among at least one descendant node of the node;

storing the acquired second list into the storage unit, wherein the one or more sets of data are generated for each of the labels; and searching for the value which is the search target of the search formula on the basis of the acquired second list, wherein the value which is the search target of the search formula corresponds to at least one keyword, wherein the steps are performed by the central processing unit.

Finally, computer readable articles of manufacture tangibly embodying computer readable instructions for executing computer implemented methods for aggregating data are also provided.

BRIEF DESCRIPTION OF THE DRAWINGS

FIG. 3 is a diagram illustrating an example of a result of aggregation.

FIG. 5B is a diagram illustrating a result of a compression effect.

FIG. 5C is a diagram illustrating an example of entries when the u2v index is created.

FIG. 6B is a diagram illustrating an example of entries when the relation index is created.

FIG. 7B is a diagram illustrating an example of data obtained by creating the v2u index.

FIG. 10A is a diagram illustrating a tree structure used in Experiment 1.

FIG. 10B is a diagram illustrating nine types of queries used in Experiment 1.

FIG. 10D is a tree structure used in Experiment 2.

FIG. 10E is a diagram illustrating nine types of queries used in Experiment 2.

FIG. 10G is a diagram illustrating the time taken for index construction.

DETAILED DESCRIPTION OF THE PREFERRED EMBODIMENTS

Figure 1A:
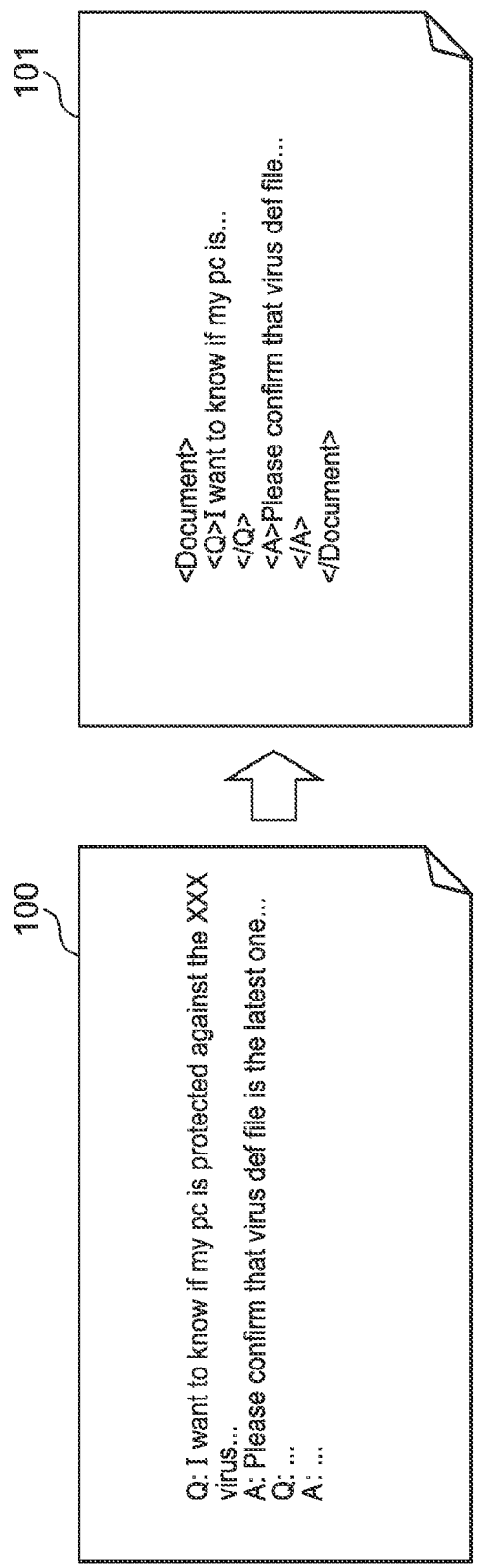
FIG. 1A is a diagram illustrating a method of processing log data by means of NLP.

The embodiments of the present invention will be described in detail with reference to the accompanying drawings. It can be appreciated that the embodiments are merely illustrative of the preferred embodiments of the present invention and not intended to limit the scope of the present invention to any specific form described in this specification. Moreover, unless otherwise specified, like reference numerals refer to like parts in the drawings described below.

In a call center, an operator responds to a query received from a customer. The call center system is capable of recording the query from the customer and a response to the query as log data. An attempt to analyze and to make good use of the log data can be seen in the data mining field. For example, there can be an analysis to determine whether "A" or "B" is referred to more often by the operator in the case where the inquiry from the customer includes a term "XXX virus" or an analysis to determine a difference in verb used in the inquiry and the response. In many cases, the process can represent a document such as a conversation recorded in log data with a tree structure having selected portions such as sentences and words included in the document as nodes.

A collection of tree structures can be a piece of information used to solve a problem. For example, a collection of tree structures containing log data of the call center is a set of the past inquiries and responses. Therefore, the collection of tree structures can be used as information when the operator responds to an inquiry that can be newly received. In order to represent a document such as a conversation recorded in log data with a tree structure, the process can use a technique that is referred to as natural language processing (NLP). NLP is a technique of extracting words and information such as a dependency relation between the words from a text described in a natural language. The process can map the words and the information such as a dependency relation between the words extracted from the log data by the NLP processing into the tree structure by a selected method.

Figure 1B:
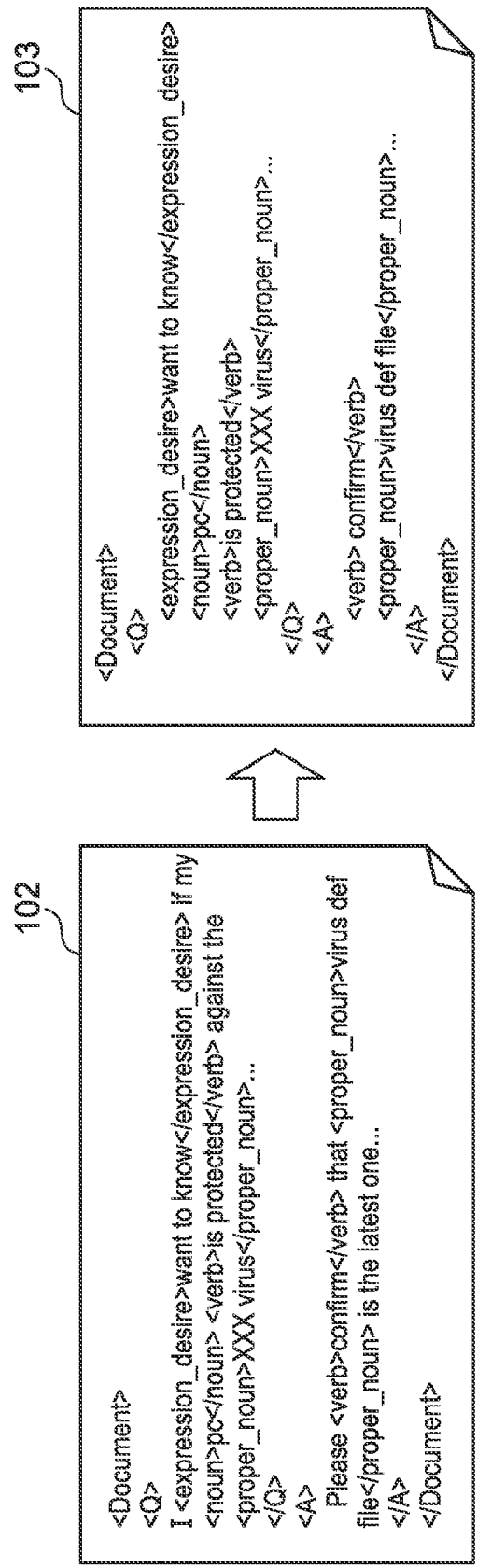
FIG. 1B is a diagram illustrating a method of processing log data by means of NLP.

FIG. 1A and FIG. 1B show a method of processing log data by using NLP, which is an embodiment of the present invention.

Referring to FIG. 1A, there is shown an example of log data 100 in the call center. In the log data 100, the query from the customer is indicated by Q and the response from the operator is indicated by A.

FIG. 1A also shows an example of data 101 where tags of the Standard Generalized Markup Language are added to the log data 100. The tags are added to provide the log data 100 with a tree structure. As the Standard Generalized Markup Language, the process can use, for example, the Extensible Markup Language (XML). A user can set the tags as desired. Tags <Document> and </Document> indicate the type of the log data 100. Tags <Q> and </Q> indicate a question. Tags <A> and </A> indicate an answer.

FIG. 1B shows data 102 of sentences and/or words extracted from the log data 100 by using NLP. The software technique for performing the NLP processing is, for example, an Unstructured Information Management Architecture (UIMA). In the data 102, tags are added so as to be preceded or followed by each portion extracted from the log data 100 by the NLP processing. Tags <expression_desire> and </expression_desire> indicate a portion including a desired expression. Tags <noun> and </noun> indicate a portion including a noun. Tags <verb> and </verb> indicate a portion including a verb. Tags <proper_noun> and </proper_noun> indicate a portion including a proper noun.

FIG. 1B also shows an example of data 103 that has been extracted by the NLP processing from the data 102. The data 103 can be used to generate data in a tree structure described below.

The data format of the data 102, 103 is illustrative only of the data format in which the data is extracted by NLP processing, but other data structures can be used. NLP processing can be applied not only to the log data of the call center, but also to various documents.

Figure 2:
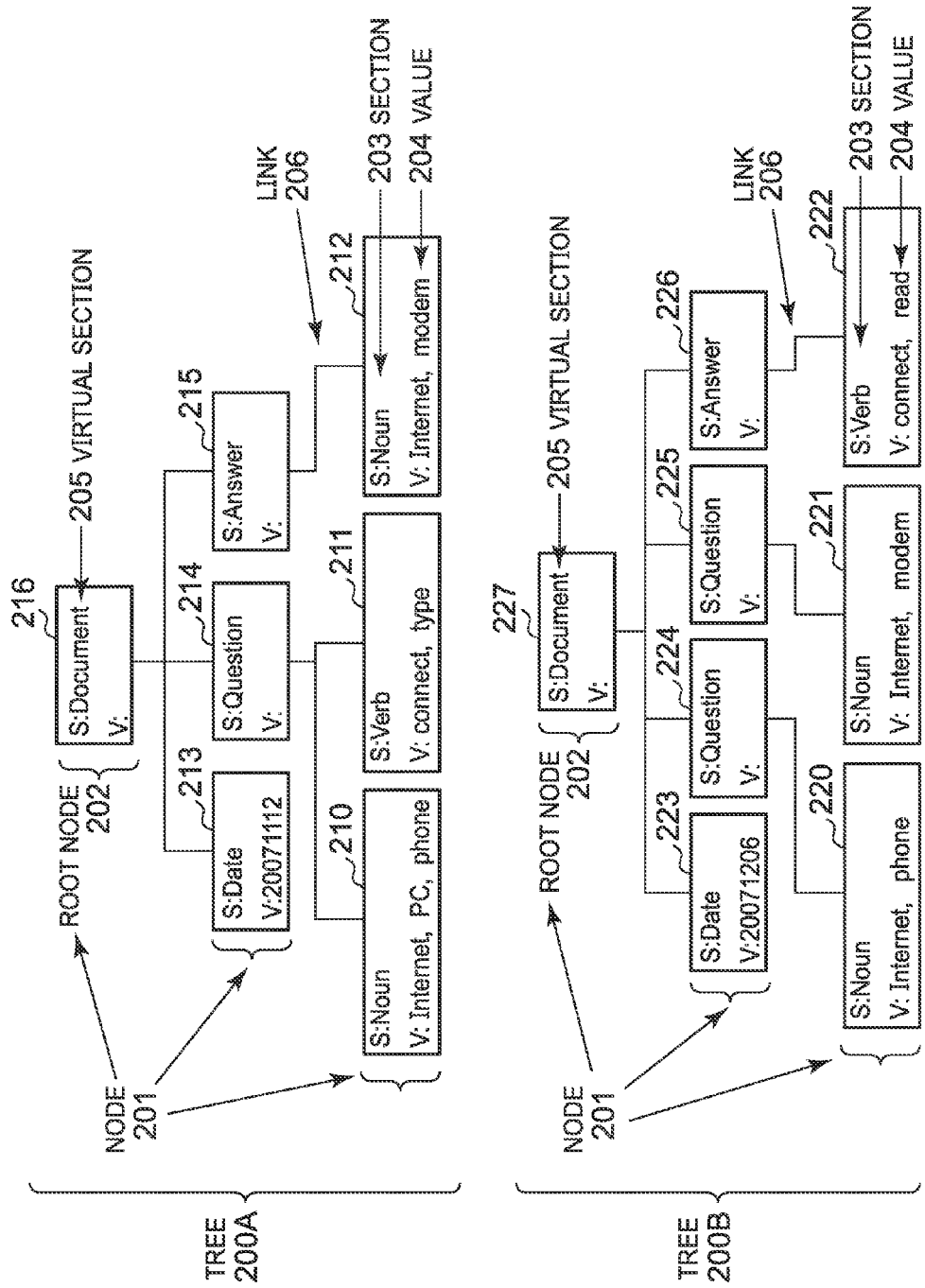
FIG. 2 is a diagram illustrating an example of two tree structures.

Referring to FIG. 2, there is shown an example of two tree structures 200A and 200B according to an embodiment of the present invention.

The tree structure includes at least one node. The node is also referred to as a unit. The tree structure will be described with reference to a tree structure 200A shown in FIG. 2. The tree structure 200A has a root node 216 and a plurality of nodes 210 to 215. Similarly, the tree structure 200B has a root node 227 and a plurality of nodes 220 to 226. The respective nodes 201 are connected to each other via links 206. Among the nodes 201 connected via the links, nodes located in upper levels are referred to as parent nodes while nodes located in lower levels are referred to as child nodes. For example, the parent node of the node 210 is a node 214.

For example, the child nodes of the node 216 are each of the nodes 213 to 215. Child nodes, child nodes of those nodes (grandchild nodes), through child nodes located in the lowest level are generically referred to as descendant nodes, when viewed from a certain parent node. For example, the descendant nodes of the node 216 are nodes 210 to 215. Each node 201 can have zero or more child nodes. The node in the highest level among the nodes 201 is referred to as a root node 202.

The node 201 contains a section 203 and a value 204 as data. The section 203 is a label that indicates the type of the node 201. One label is assigned to each node 201. For example, a label "Noun" is assigned to each of the sections of the nodes 210, 212. Similarly, a label "Verb" is assigned to the section of a node 211. If the root node 202 has no section to which a label is assigned, a virtual section 205 is assigned.

A value 204 includes a numerical value, a character string, or a combination of those. One node 201 includes zero or more values 204. For example, the node 213 has only one value of 20071112, while the node 212 has two values of "Internet" and "modem." Moreover, the node 214 has no value and thus includes zero value. The zero value can be represented by a null or blank value.

The tree-structured data in FIG. 2 shows an example of a conversion from the above log data to the tree-structured data. Each of the tree structures 200A, 200B represents a document of the log data 100.

The virtual sections 205 of the root nodes 216, 227 in the tree structures 200A, 200B each indicate that the corresponding tree structure relates to a "document." Each of the nodes 201 in the tree structures 200A, 200B indicates information of the document of the tree structures 200A, 200B. For example, the nodes 213, 223 each having a section "Date" indicate that each node has information on document creation date. The document creation date is indicated by a value. Moreover, nodes 214, 224, and 225 each having a section "Question" indicate that each node has information on a query content from a customer. Note that, however, the nodes 214, 224, and 225 each whose section is "Question" do not have any query content from the customer as a value in the tree structures 200A, 200B. It is because the nodes 214, 224, and 225 whose section is "Question" include child nodes 210 to 211, 220, and 221, respectively, subdivided according to the type of the query content from the customer.

For example, the nodes 210, 220, and 221 whose section is "Noun" among the child nodes 210 to 211, 220, and 221 each have a noun contained in the query as a value. The nodes 211 and 222 whose section is "Verb" each have a verb contained in the query as a value. A target to be stored as a value when creating tree-structured data can be a keyword. The keyword is extracted from the text of the query by using a technique such as NLP processing. A method of the extraction can be a method in common use. For example, the process can use a method of extracting the keyword by analyzing the frequency of occurrence of a word, a method of extracting the keyword by using a large word list, and a method of extracting the keyword by analyzing a sentence construction.

The aggregation will be described below by using data in the tree structures 200A, 200B shown in FIG. 2.

The term "aggregation" means counting values with nodes each having a given section as a counting unit. The counting unit is a basis where the frequency of the same value is counted as one no matter how many times the same value appears in its descendant nodes of the node in the tree structure. The counting is, for example, processing of outputting pairs of a value and its occurrence number, also referred to as frequency, in the frequency descending or ascending order with respect to the value, or processing by calculating the pairs by using a selected set function. The selected set function is, for example, count (the number of items), sum (sum total), min (minimum value), max (maximum value), or avg (average) and can include a function uniquely defined by a user.

The table 300 in FIG. 3 shows the result of outputting values and their frequencies in the descending order under the search condition described below.

The search condition is that in the tree structures 200A, 200B in FIG. 2, the nodes 216, 227 whose section is "Document" are treated as counting units to output values and their frequencies in the nodes 210, 212, 220, 221 whose section is "Noun" in descending order. The following describes the process of deriving a resulting output under the search condition.

First, the case where the root node 216 is used as a counting unit node will be discussed. There are two nodes 210, 212 that correspond to descendant nodes of the root node 216, which is the counting unit, and whose section is "Noun." The node 210 has values of "Internet," "PC," and "phone." The node 212 has values of "Internet" and "modem." Therefore, if the root node 216 is used as a counting unit node, the obtained values are "Internet," "PC," "phone," and "modem." Note here that "Internet" appears in both the node 210 and the node 212. The occurrence number of the value "Internet," however, is counted as one since both nodes 210, 212 are descendant nodes of the root node 216, which is the counting unit.

Next, the case where the root node 227 is used as a counting unit node will be discussed. There are two nodes 220, 221 that correspond to descendant nodes of the root node 227, which is the counting unit, and whose section is "Noun." The node 220 has values of "Internet" and "phone." The node 221 has values of "Internet" and "modem." Therefore, if the root node 227 is used as a counting unit node, the obtained values are "Internet," "phone," and "modem." Note here that "Internet" appears in both the node 220 and the node 221. The occurrence number of the value "Internet," however, is counted as one since both nodes 220, 221 are descendant nodes of the root node 227, which is the counting unit.

According to the above, if the root nodes 216, 227 whose section is "Document" are treated as counting units to obtain the values and their frequencies in the nodes 210, 212, 220, 221 whose section is "Noun," the frequencies of the values are obtained as follows: twice for the value "Internet," twice for the value "modem," twice for the value "phone," and once for the value "PC."

Although the root node has been considered as a counting unit node in the above, the process can be applied to a node other than the root node. That example will be described below.

The table 301 in FIG. 3 shows the result of outputting values and their frequencies in descending order according to the search condition described below.

The search condition is that in the tree structures 200A, 200B in FIG. 2, the nodes 214, 224, 225 whose section is "Question" are treated as counting units to output values and their frequencies in the nodes 210, 212, 220, 221 whose section is "Noun" in descending order.

First, a node that is a descendant node of the node 214, which is one of the nodes treated as counting units, and whose section is "Noun" is the node 210. The node 210 has values of "Internet," "PC," and "phone."

Next, a node that is a descendant node of the node 224, which is one of the nodes treated as counting units, and whose section is "Noun" is the node 220. The node 220 has values of "Internet" and "phone."

Last, a node that is a descendant node of the node 225, which is one of the nodes treated as counting units, and whose section is "Noun" is the node 221. The node 221 has values of "Internet" and "modem."

According to the above, if the root nodes 214, 224, 225 whose section is "Question" are treated as counting units to obtain the values and their frequencies in the nodes 210, 212, 220, 221 whose section is "Noun," the frequencies of the values are obtained as follows: three times for the value "Internet," twice for the value "phone," once for the value "modem," and once for the value "PC."

The table 302 in FIG. 3 shows an aggregation result of values under the search condition described below.

The search condition is that In the tree structures 200A, 200B in FIG. 2, the nodes 216, 227 whose section is "Document" are treated as counting units to count values and their frequencies in the child nodes of the nodes whose section is "Answer" where the section of the child nodes is "Noun" in the case where the child nodes correspond to the child nodes of the nodes whose section is "Question," the section of the child nodes is "Noun," and the child nodes include the value of "Internet."

As a search result, "Internet" and "modem" are obtained, which are the values of the node 212. The frequencies obtained as the search result are as follows: once for "Internet" and once for "modem."

The search condition is an example of complicated aggregation. The aggregation is intended only for the node 212 that is a child node of the node whose section is "Answer" where the section of the child node is "Noun." The aggregation enables the recognition of the contents of words spoken by an operator, for example, when the customer mentions the Internet.

Figure 4:
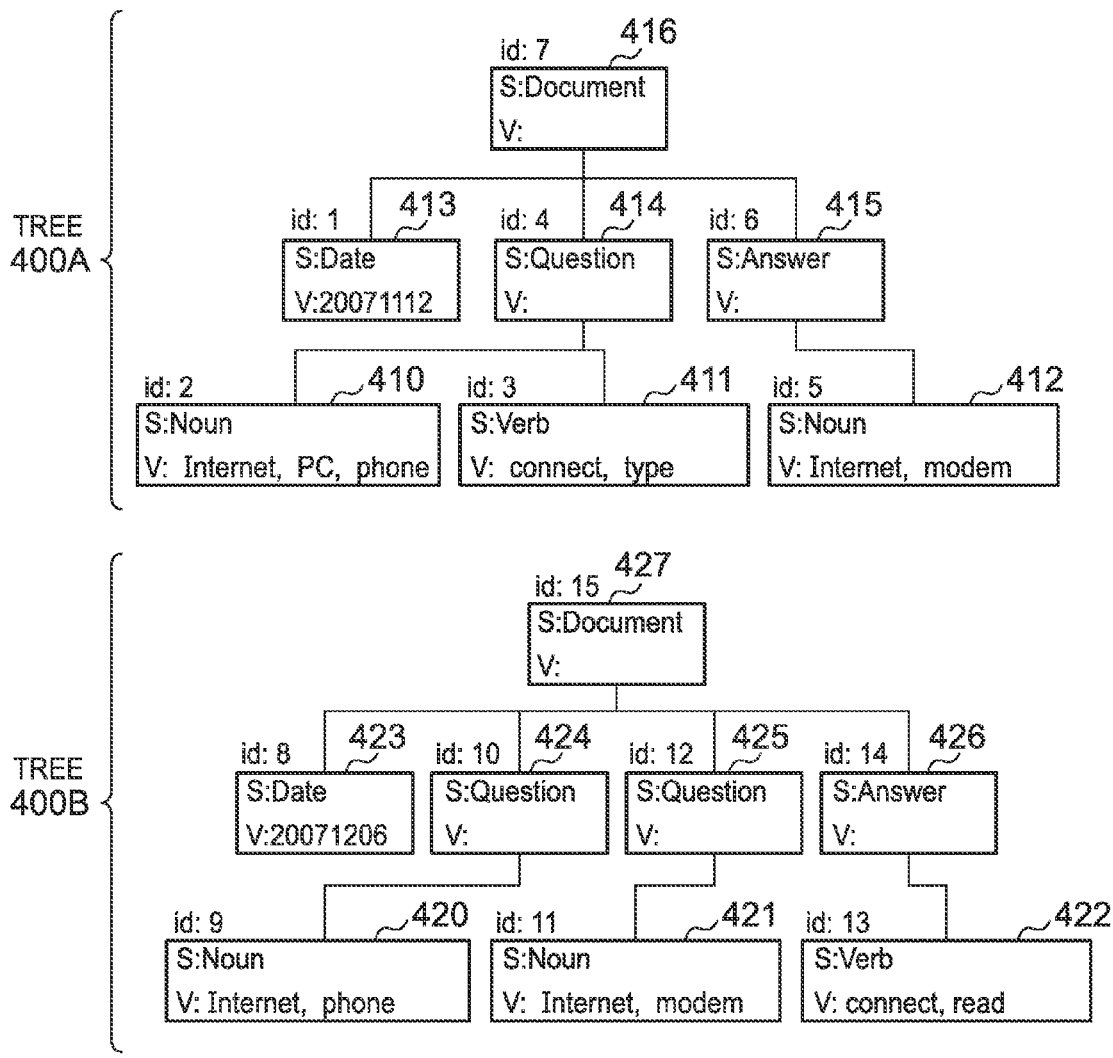
FIG. 4 is a diagram illustrating an example of assigning node IDs to respective nodes in the post order.

FIG. 4 shows an example of assigning node IDs to the respective nodes in post order, which is an embodiment of the present invention.

The node IDs are assigned by using the post order, which a traversal method for a tree structure. The post order is also referred to as postposition order. The post order for the tree structure is a processing order defined recursively such that a tree with T1 as a root node is processed in the post order, a tree with T2 as a root node is processed in the post order, . . . , a tree with Tk as a root node is processed in the post order, and T is processed, where T is the root node of the tree and child elements of T are T1, . . . , and Tk. The node ID can be, for example, an integer value.

Tree structures 400A and 400B in FIG. 4 correspond to the tree structures 200A and 200B in FIG. 2, respectively. IDs 1 to 15 in FIG. 4 are node IDs assigned to the respective nodes.

The following describes a procedure for assigning node IDs to the nodes in the post order for the tree structures 400A, 400B.

First, a node 416 that is the root node of the tree structure 400A is selected. Subsequently, a node 413 that is the first child node 413 from the left is selected from the child nodes of the node 416. The node 413 has no child node and therefore a node ID 1 is assigned to the node 413. Then, a parent node 416 of the node 413 is selected. The second child node 414 from the left is selected from the child nodes of the parent node 416. The node 414 has its child nodes 410, 411 and therefore the first child node 410 from the left is selected. The node 410 has no child node and therefore node ID 2 is assigned to the node 410. Then, the parent node 414 of the node 410 is selected.

Subsequently, the second child node 411 from the left is selected from the child nodes of the node 414. The node 411 has no child node and therefore node ID 3 is assigned to the node 411. Next, the parent node 414 of the node 411 is selected. Since IDs are assigned to all child nodes 410, 411 of the node 414, node ID 4 is assigned to the node 414. Then, the parent node 416 of the node 414 is selected. The third child node 415 from the left is selected from the child nodes of the node 416. The node 415 has its child node 412 and therefore the first child node 412 from the left is selected. The node 412 has no child node and therefore node ID 5 is assigned to the node 412.

Next, the parent node 415 of the node 412 is selected. Since IDs are assigned to all child nodes 412 of the node 415, node ID 6 is assigned to the node 415. Subsequently, the parent node 416 of the node 415 is selected. Since IDs are assigned to all child nodes 413, 414, and 415 of the node 416, node ID 7 is assigned to the node 416. According to the above procedure, node IDs are assigned to all nodes included in the tree structure 400A.

Next, the other tree structure 400B will be described. If node IDs are assigned to the respective nodes in the post order, the assignment of the node IDs starts with the subsequent ID number, 8 in the above example. To see the result of assigning the node IDs to the nodes in the post order in the tree structure 400B, refer to FIG. 4.

In the embodiment described below, data shown in the tree structure in FIG. 4 will be referred to. The definition of the data shown in the tree structure is as described below.

A set of data having a tree structure is represented by $D=\{T_1, T_2, \ldots, T_i, \ldots, T_m\}$ ($1 \leq i \leq m$). Note that m is at least 1. Each T includes a finite number of nodes. A symbol $T_i$ is used below to indicate the root node of $T_i$. The number of nodes included in $T_i$ is denoted by $n_i$.

Each node has one section and zero or more values. The section includes one label (b) indicating a node type. Therefore, the process can redefine the section as a label in the above node definition. Below, the section is represented by S, and the value is represented by VL.

One node has information $\{b; VL_1, VL_2, \ldots, VL_i, \ldots, VL_k\}$ ($0 \leq i \leq k$) in addition to the information on the parent-child relationship between nodes. Note here that k can be 0. In other words, a node need not have VL. In one embodiment of the present invention, a value such as, for example, a character string "modem" can be encoded by a unique integer value.

A set of all labels that appear in D is represented by $L=\{b_1, b_2, \ldots, b_i, \ldots, b_p\}$ ($1 \leq b \leq p$). Each label $b_i$ can be encoded by an integer value suitable for compression. For example, the labels "Document," "Date," and "Question" are encoded by values 1, 2, and 3, respectively. In the case where an unknown label appears during sequential reading of the tree structure in D, a new integer value is assigned to the label each time.

All of the sections of the root nodes in the above need not be identical. The process can obtain the same result for the case in which all sections of the root nodes are the same by performing a join operation for the descendant nodes on an aggregation unit section Sc described below.

In the embodiment of the present invention, three indices, namely the first index, the second index, and the third index are created in order to perform the aggregation for tree-structured data.

The first index, referred to as u2v index, is one or more sets of stored data including the node ID of each node and values included in the node. In the u2v index, the set of data is created for each section. In one embodiment of the present invention, the u2v index sequentially stores the above sets of data.

Figure 5A:
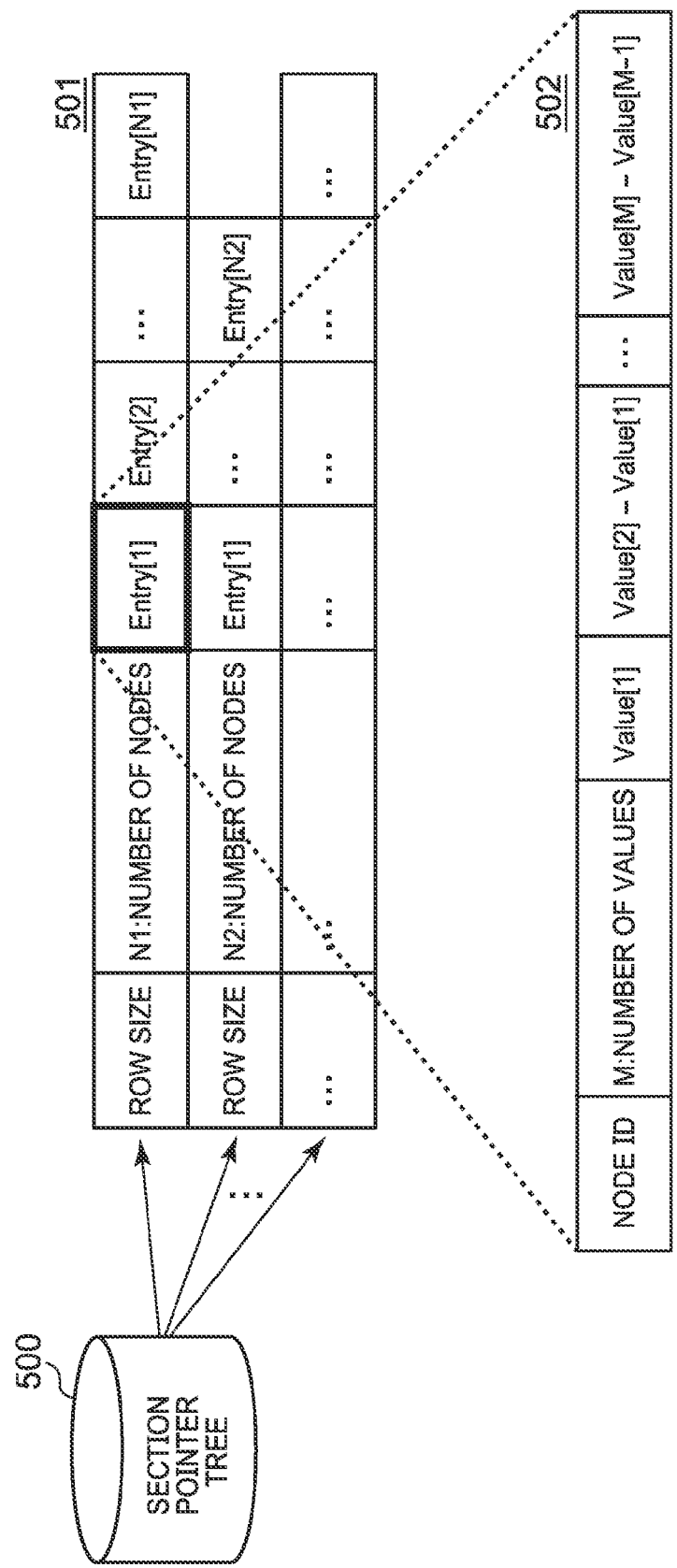
FIG. 5A is a diagram illustrating an example of a conceptual schema of a u2v index and its storage.

FIG. 5A shows an example of a conceptual schema of the u2v index and its storage. The conceptual schema of the u2v index is represented by a section pointer tree 500 and tables 501 and 502. The section pointer tree 500 represents aggregate data of pointers to the rows of the table 501.

Each row of the table 501 represents an index of one section. The first column represents a row size. The second column represents the number of nodes corresponding to each section. The third and subsequent columns represent entries whose number is equal to the number of nodes corresponding to the section.

Table 502 shows the details of an entry. The first column represents a node ID. The second column represents the number of values included in the node to which the node ID is assigned. The third and subsequent columns represent values included in the node to which the node ID is assigned. In one embodiment of the present invention, the values set in the third and subsequent columns can be differentially compressed. The differential compression method will be described later.

The data format of the u2v index of one section is as described below. The data format corresponds to the first row of the table 501.

```
{byte_size_of_array}(N:number_of_nodes)
[id_1][M_1:number_of_values_1]
<value_1,1><value_1,2 –value_1,1>...<value_1,M_1– value_1,M_1–1>
[id_2][M_2:number_of_values_2]
<value_2,1><value_2,2 –value_2,1>...<value_2,M_2– value_2,M_2–1>
...
[id_N][M_N:number_of_value_N]
<value_N,1><value_N,2 –value_N,1>...<value_N,
M_N– value_N,M_N–1>
```

The lines of the above data format are for illustration and not included in the data. In addition, delimiters such as { }, ( ), [ ], and < > are for indicating logical breakpoints of data and not included in data. The delimiter { } denotes uncompressed long data (8 bytes). The delimiter ( ) denotes uncompressed data int (4 bytes). The term "uncompressed" means that the data is normally encoded in the 2's complement notation. In addition, the delimiter [ ] denotes compressed int. The delimiter < > denotes differentially compressed int. The term "compressed" can be used to mean "variable-length encoded."

The term "byte_size_of_array" denotes the length of a byte sequence from [id_1] at the beginning to <value_N,M_N– value_N,M_N–1> at the end. "N" denotes the number of stored nodes, and "id" denotes a node ID. A value following an underscore is a notational number attached in order to identify a node. "M" denotes the number of values. A value of M with a right subscript denotes a notational number attached in order to identify a node, and "value" denotes a value. A value following an underscore is a notational number attached in order to identify a node. A value following a comma is a notational number attached in order to identify a value.

The u2v index is a concatenation of the data formats of all sections. As one embodiment of the present invention, the data formats are sequentially concatenated. If there are only two types of sections, for example, the data formats are as follows:

```
{byte_size_of_array}(N1:number_of_nodes)
[id_1][M_1:number_of_values_1]
<value_1,1><value_1,2 –value_1,1>...<value_1,M_1– value_1,M_1–1>
...
[id_N1][M_N1:number_of_value_N1]
<value_N1,1><value_N1,2 –value_N1,1>...
```

```
<value_N1,M_{N1}- value_N1,M_{N1}-1>
{byte_size_of_array}(N2:number_of_nodes)
[id_1][M_1:number_of_values_1]
<value_1,1><value_1,2 -value_1,1>...<value_1,M_1- value_1,M_1-1>
...
[id_N2][M_{N2}:number_of_value_N2]
<value_N2,1><value_N2,2 -value_N2,1>...
<value_N2,M_{N2}- value_N2,M_{N2}-1>
```

Preferably, the data formats are stored in the memory of a computer in order to improve efficiency of index creation. The capacity of the memory has limits, however, and therefore the computer can write data to a file after a certain amount of data is stored in the memory. The timing of writing the data to the file is determined, for example, according to the number of processed nodes. For example, writing data into the file starts every time the processing of 100,000 nodes is completed. As can be seen from the data format, it is easy to merge files even if the data is divided into a plurality of files.

In this embodiment of the present invention, any selected compression method can be used. For example, the process can use a method which is the same as the method used for a full-text search engine Lucene that is generally known as gap coding. The gap coding is a method of calculating a difference with respect to a monotonically increasing integer sequence, for example 1, 4, 37, 51, 80. Then, it is concluded that a certain node has five values, 1, 4, 37, 51, and 80. First, in this method, the values are arranged in ascending order. Then, a difference from the previous value is obtained for each value. The obtained differences are converted to a sequence, 1, 3, 33, 14, and 29, and the values obtained after the conversion are encoded in such a way that a smaller bit number is assigned to a smaller numerical value. In decoding, the numerical values are decoded sequentially by using the last value that has been placed in memory (the initial value is 0) and then each value is added to the previous value in sequence. This method enables a high compression ratio particularly when one node includes a large number of values.

In the example of Table 502 in FIG. 5A, value [1] which is the minimum value is placed in the third column. Then, a difference between value [2] which is the second minimum value and value [1] which is the minimum value is placed in the fourth column. The same process is repeated for the rest of the values. In the last step, the difference between value [M] which is the maximum value and value [M-1] which is the second maximum value is placed in the last column Regarding a compression method that takes place after the difference calculation, there are, for example, methods described as follows:

Variable-length coding is classified into Huffman coding, run-length coding, arithmetic coding, and adaptive bit allocation.

Gamma coding is a method of representing an integer in binary and outputting a value obtained by adding 0s of the number of bits of the binary number minus 1 to the value obtained by representing the integer in binary.

Golumb coding includes the following three procedures:

First, compute floor(n/m) and output a unary code, where floor(x) represents the maximum integer not exceeding x and the unary code of a positive number "a" represents a code "00 ... 01" formed by zeros whose number is equal to "a" and a subsequent one "1";

Next, compute modulo mod(n/m) of n/m and output the modulo represented by a binary code of floor(log 2(m)) digits;

Finally, connect the two values in this order to obtain the Golumb code of n.

Table 503 in FIG. 5B shows the result of the compression effect. Data used for the comparison of the compression includes 324677 pieces of log data of a call center. The comparison has been made by using u2v index files created for each section. The first column of Table 503 represents a selected section. An uncompressed index file size (A) in the second column represents a file size of a u2v index file that has not been compressed. A compressed index file size (B) in the third column represents a file size of a u2v index file compressed by the variable-length coding. A compression ratio in the fourth column represents a compression ratio in percent (%) of a file size between the compressed file and the uncompressed file.

As shown in Table 503, the compression ratio depends on the section type. After the compression, the file size of the u2v index file is reduced by 35 to 52 percent in comparison with the uncompressed file size.

Table 504 in FIG. 5C shows an example of entries when the u2v index is created from data in the tree structures 400A, 400B. Note that the first column "Section" is added for description. The value shown as "Value" in Table 504 indicates a keyword. In one embodiment of the present invention, the value is converted to a numerical value. In another embodiment of the present invention, the value is compressed.

The following describes an example for creating the u2v index from the data in the tree structures 400A and 400B, with respect to nodes 410, 412, 420, and 421 whose section is Noun and nodes 411 and 422 whose section is Verb.

First, the example will use the nodes 410, 412, 420, and 421 whose section is Noun. The node ID of the node 410 is 2. Therefore, 2 is placed in the column of "node ID" of Entry [1] in the row of the Noun section on Table 504. The node 410 has three values, namely Internet, PC, and phone. Therefore, 3 is placed in the column of "the number of values" of Entry [1] in the row of the Noun section. "Internet," "PC," and "phone" are placed in the column of "value" of Entry [1] in the row of the Noun section.

The node ID of the node 412 is 5. Therefore, 5 is placed in the column of "node ID" of Entry [2] in the row of the Noun section on Table 504. The node 412 has two values, namely Internet and modem. Therefore, 2 is placed in the column of "the number of values" of Entry [2] in the row of the Noun section. "Internet" and "modem" are placed in the column of "value" of Entry [2] in the row of the Noun section.

The node ID of the node 420 is 9. Therefore, 9 is placed in the column of "node ID" of Entry [3] in the row of the Noun section on Table 504. The node 420 has two values, namely Internet and phone. Therefore, 2 is placed in the column of "the number of values" of Entry [3] in the row of the Noun section. "Internet" and "phone" are placed in the column of "value" of Entry [3] in the row of the Noun section.

The node ID of the node 421 is 11. Therefore, 11 is placed in the column of "node ID" of Entry [4] in the row of the Noun section on Table 504. The node 421 has two values, namely Internet and modem. Therefore, 2 is placed in the column of "the number of values" of Entry [4] in the row of the Noun section. "Internet" and "modem" are placed in the column of "value" of Entry [4] in the row of the Noun section.

Next, the process will be described for the nodes 411 and 422 whose section is Verb. The node ID of the node 411 is 3. Therefore, 3 is placed in the column of "node ID" of Entry [1] in the row of the Verb section on Table 504. The node 411 has two values, namely connect and type. Therefore, 2 is placed in the column of "the number of values" of Entry [1] in the row of the Verb section. The values "connect" and "type" are placed in the column of "value" of Entry [1] in the row of the Verb section.

The node ID of the node 422 is 13. Therefore, 13 is placed in the column of "node ID" of Entry [2] in the row of the Verb section on Table 504. The node 422 has two values, namely connect and read. Therefore, 2 is placed in the column of "the number of values" of Entry [2] in the row of the Verb section. The values "connect" and "read" are placed in the column of "value" of Entry [2] in the row of the Verb section.

The u2v index is stored in an electronic file, which need not be a single file, but can be a plurality of files. In implementation, the section pointer tree 500 is also written into a file, not shown, that records the offset of the u2v index for each section. The file stores the corresponding starting position, namely the starting byte position. The storage format can be any selected format. For example, a B-tree can be used.

The second index, referred to as relation index, is one or more sets of stored data including the node ID of each node and the node ID of a descendant node having the minimum node ID among at least one descendant nodes of the node concerned. In the relation index, the set of data is created for each section. In one embodiment of the present invention, the relation index stores the above sets of data sequentially.

Figure 6A:
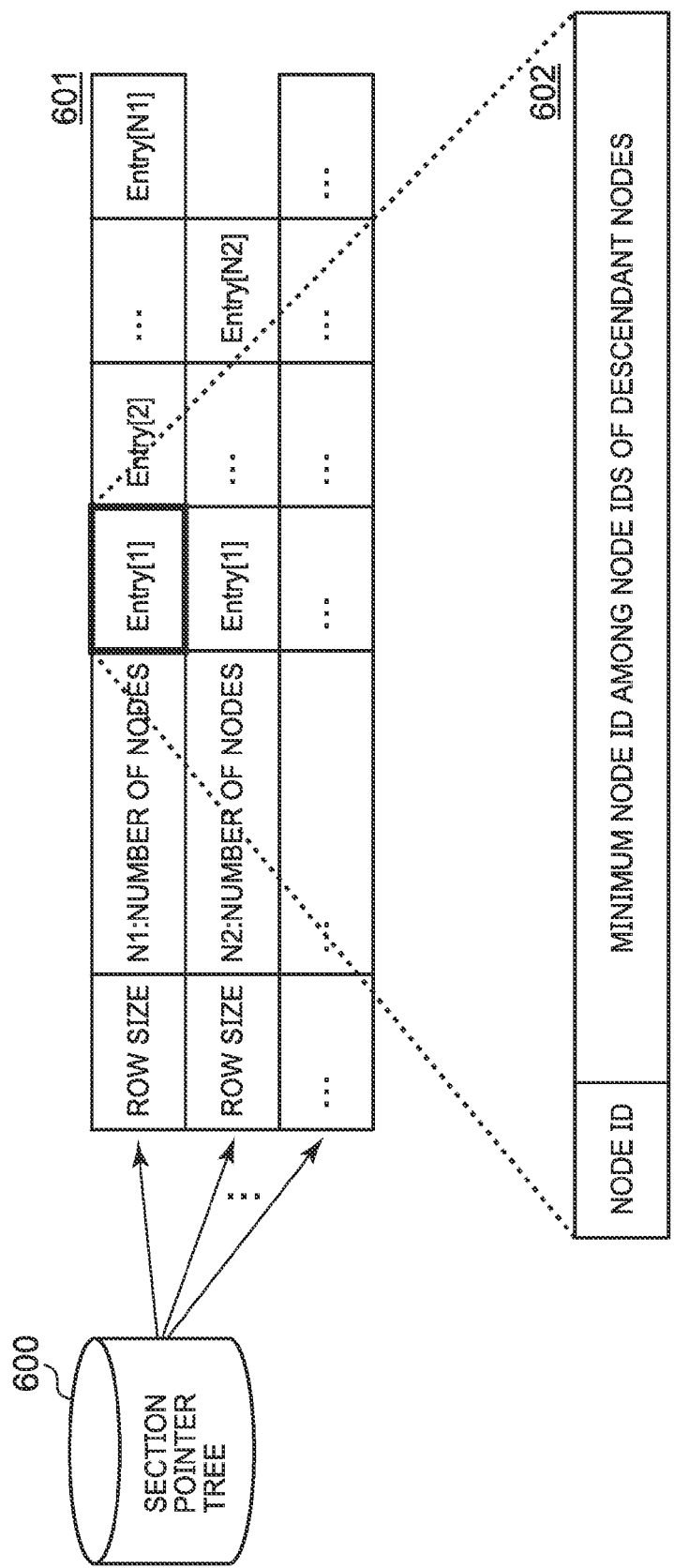
FIG. 6A is a diagram illustrating an example of a conceptual schema of a relation index and its storage.

FIG. 6A shows an example of a conceptual schema of the relation index and its storage, which is an embodiment of the present invention. The conceptual schema of the relation index is represented by a section pointer tree 600 and tables 601 and 602. The section pointer tree 600 represents aggregate data of pointers to the rows of the table 601. Each row of the table 601 represents an index of one section. The first column represents a row size. The second column represents the number of nodes corresponding to each section. The third and subsequent columns represent entries whose number is equal to the number of nodes corresponding to the section. Table 602 shows the details of the entry. The first column represents a node ID. The second column represents the minimum ID of the node IDs of the descendant nodes.

The data format of the relation index of one section is as described below. The data format corresponds to the first row of Table 601.

```
{byte_size_of_array}(N:number_of_nodes)
[id_1][min_id_1][id_2][min_id_2]......[id_N][min_id_N]
```

The lines shown in the above data format are for illustration and not included in the data. In addition, delimiters such as { }, ( ), and [ ] are for use in indicating logical breakpoints in the data and not included in data. The delimiter { } denotes uncompressed long (8 bytes). The delimiter ( ) denotes uncompressed int (4 bytes). The term "uncompressed" means that the data is normally encoded in the 2s complement notation. In addition, the delimiter [ ] denotes compressed int. The term "compressed" can be used to mean "variable-length encoded."

The term "byte_size_of_array" denotes the length of a byte sequence from [id_1] at the beginning to [min_id_N] at the end. "N" denotes the number of stored nodes, and "id" denotes a node ID. A value following an underscore is a notational number attached in order to identify a node. "min_id" denotes the node ID of a node having the minimum node ID among the descendant nodes of the node ID to which the same notational number is assigned.

Table 603 in FIG. 6B shows an example of entries for which the relation index is created from the data in the tree structures 400A and 400B. Note that the first column "Section" is added for description.

Preferably, the data format is stored in the memory of a computer as far as is possible in order to improve the efficiency of index creation. The capacity of the memory has limits, however, and therefore the computer can write data to a file when a certain amount of data is stored in the memory. The timing of writing the data to the file is determined, for example, according to the number of processed nodes. For example, writing data into the file starts every time the processing of 100,000 nodes is completed. As apparent from the data format, it is easy to merge files even if the data is divided into a plurality of files.

The following shows an example for creating the relation index from the data in the tree structures 400A and 400B. The following examines the nodes 416 and 427 whose section is "Document." The corresponding index is located in the second row of Table 603 of the section "Document." The node ID of the node 416 is 7. Therefore, 7 is placed in "node ID" which is in the second column of Table 603. The node having the minimum node ID among the descendant nodes 410 to 415 of the node 416 is the node 413. The node ID of the node 413 is 1. Therefore, 1 is placed in "the minimum node ID" which is in the third column of Table 603. The node ID of the node 427 is 15. Therefore, 15 is placed in "node ID" which is in the fourth column of Table 603. The node having the minimum node ID among the descendant nodes 420 to 426 of the node 427 is the node 423. The node ID of the node 423 is 8. Therefore, 8 is placed in "the minimum node ID" which is in the fifth column of Table 603.

The following examines the nodes 414, 424, and 425 whose section is "Question." The corresponding index is located in the third row of Table 603 of the section "Question." The node ID of the node 414 is 4. Therefore, 4 is placed in "node ID" which is in the second column of Table 603. The node having the minimum node ID among the descendant nodes 410 to 411 of the node 414 is the node 410. The node ID of the node 410 is 2. Therefore, 2 is placed in "the minimum node ID" which is in the third column of Table 603. The node ID of the node 424 is 10. Therefore, 10 is placed in "node ID" which is in the fourth column of Table 603.

The node having the minimum node ID among the descendant nodes 420 of the node 424 is the node 420. The node ID of the node 420 is 9. Therefore, 9 is placed in "the minimum node ID" which is in the fifth column of Table 603. The node ID of the node 425 is 12. Therefore, 12 is placed in "node ID" which is in the sixth column of Table 603. The node having the minimum node ID among the descendant nodes 421 of the node 425 is the node 421. The node ID of the node 421 is 11. Therefore, 11 is placed in "the minimum node ID" which is in the seventh column of Table 603.

The following examines the nodes 415 and 426 whose section is "Answer." The corresponding index is located in the fourth row of Table 603 of the section "Answer." The node ID of the node 415 is 6. Therefore, 6 is placed in "node ID" which is in the second column of Table 603.

The node having the minimum node ID among the descendant nodes 412 of the node 415 is the node 412. The node ID of the node 412 is 5. Therefore, 5 is placed in "the minimum node ID" which is in the third column of Table 603. The node ID of the node 426 is 14. Therefore, 14 is placed in "node ID" which is in the fourth column of Table 603. The node having the minimum node ID among the descendant nodes 422 of the node 426 is the node 422. The node ID of the node 422 is 13. Therefore, 13 is placed in "the minimum node ID" which is in the fifth column of Table 603.

The nodes 413, 410, 411, 412, 423, 420, 421, and 422 whose section is "Date," "Noun," or "Verb" do not have any descendant node. The relation index is not created for the nodes having no child node, namely leaf nodes.

The relation index is stored in an electronic file, which need not be a single file, but can be a plurality of files. In implementation, the section pointer tree 600 is also written into a file, not shown, that records the offset of the relation index for each section. The file stores the corresponding starting position, namely the starting byte position. The storage format can be any that is selected. For example, a B-tree can be used.

The third index, referred to as v2u index, consists of one or more sets of stored data including the node IDs of one or more nodes including specific values. In the v2u index, the set of data is created for each label and for each specific value. In one embodiment of the present invention, the v2u index stores the above sets of data sequentially. The v2u index is in a data format that enables the retrieval of a list of node IDs of the section including the value from the value of each node.

Figure 7A:
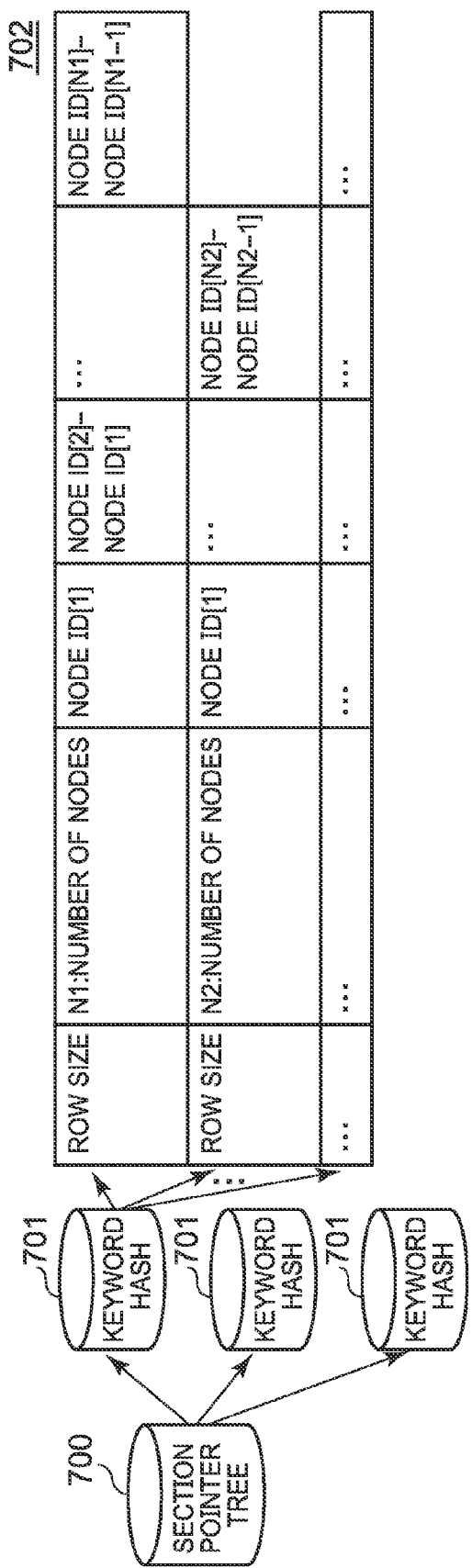
FIG. 7A is a diagram illustrating an example of a conceptual schema of a v2u index and its storage.

FIG. 7A shows an example of a conceptual schema of the v2u index and its storage. The conceptual schema of the v2u index is represented by a section pointer tree 700, hash structures 701 whose number corresponds to the number of sections, and a table 702 corresponding to each hash structure. The section pointer tree 700 represents aggregate data of pointers to the hash structures 701 prepared for the respective sections. The hash structure 701 represents aggregate data of pointers to the rows shown in Table 702.

Each row of the table 702 represents an index for each specific value. The first column represents a row size. The second column represents the number of nodes each having a specific value. The third and subsequent columns represent node IDs of the nodes each having the specific value. In one embodiment of the present invention, the node IDs included in the third and subsequent columns of Table 702 are compressed similarly to the example for the u2v index.

Table 703 in FIG. 7B shows an example of data obtained by creating the v2u index from the data in the tree structures 400A and 400B, with respect to the nodes 410, 412, 420, and 421 whose section is "Noun." Note that, however, the first column "Value" is added for description and is not included in the v2u index. Moreover, the node IDs are compressed according to one embodiment of the present invention.

The data format of the v2u index of one section for one value is as described below. The data format corresponds to the first row of Table 702.

{byte_size_of_array}(N:number_of_nodes)
<id,1><id,2 − id,1>...<id,N$_1$− id,N$_1$−1>

The lines in the above data format are for illustration and are not included in the data. In addition, delimiters such as { }, ( ), and < > are for use in indicating logical breakpoints of the data and not included in data. The delimiter { } denotes uncompressed long (8 bytes). The delimiter ( ) denotes uncompressed int (4 bytes). The term "uncompressed" means that the data is normally encoded in the 2's complement notation. In addition, the delimiter < > denotes differentially compressed int. The term "compressed" can be used to mean "variable-length encoded."

The term "byte_size_of_array" denotes the length of a byte sequence from <id_1> at the beginning to <id,N$_1$−id,N$_1$−1> at the end. "N" denotes the number of stored nodes, and "id" denotes a node ID. A value following a comma is a notational number attached in order to identify a node.

Preferably, the data format is stored in the memory of a computer as far as is possible in order to improve efficiency of index creation. The capacity of the memory has limits, however, and therefore the computer can begin to write data to a file when a certain amount of data is stored in the memory. The timing of writing the data to the file is determined, for example, according to the number of processed nodes. For example, writing data into the file starts every time the processing of 100,000 nodes is completed. As apparent from the data format, it is easy to merge files even if the data is divided into a plurality of files.

The following describes an example for creating the v2u index from the data in the tree structures 400A and 400B, with respect to the nodes 410, 412, 420, and 421 whose section is "Noun." Among the nodes 410, 412, 420, and 421 whose section is "Noun," the nodes 410, 412, 420, and 421 have the value of "Internet." Therefore, 2, 5, 9, and 11, which are the node IDs of the nodes 410, 412, 420, and 421, are placed in the first row of Table 703 of FIG. 7B.

Among the nodes 410, 412, 420, and 421 whose section is "Noun," only the node 410 has the value of "PC." Therefore, 2 which is the node ID of the node 410, is placed in the second row of Table 703. Among the nodes 410, 412, 420, and 421 whose section is "Noun," the nodes 412 and 421 have the value of "modem." Therefore, 5 and 11, which are the node IDs of the nodes 412 and 421, are placed in the third row of Table 703. Among the nodes 410, 412, 420, and 421 whose section is "Noun," the nodes 410 and 420 have the value of "phone." Therefore, 2 and 9, which are the node IDs of the nodes 410 and 420, are placed in the fourth row of Table 703.

The v2u index is stored in an electronic file, which need not be a single file, but can be a plurality of files. In implementation, the section pointer tree 700 is also written into a file, not shown, that records the offset of the v2u index for each section. The file stores the corresponding starting position, namely the starting byte position. The storage format can be any selected. For example, a B-tree can be used. Moreover, when a value is given, a pointer for random access to each row of Table 702 is stored in the hash structure 701. The hash mechanism can be any selected but only if the process can subtract a pointer value from the value in real time. Moreover, the hash structure is created for each section and therefore the pointer from the section to the hash structure is also stored.

FIG. 8A to FIG. 8F show flowcharts and diagrams associated with the method of the embodiment of the invention. Terms used in the flowcharts will be described as follows. T represents a tree structure. Moreover, |T| represents the number of nodes included in T. In the example of the tree structure 400A, |T|=7. N represents a node. "N. section" represents a section of the node N. "N. values" represents a value of the node N. "N. unitId" represents a node ID assigned to the node N. Moreover, it is concluded that a section is previously converted to a numerical value. For example, "Document"=1, "Question"=2, and "Noun"=3. In the example of node 410, "N. section" is "Noun"=3, "N. values" are "Internet," "PC," and "phone," and "N. unitId" is 2.

Figure 8A:
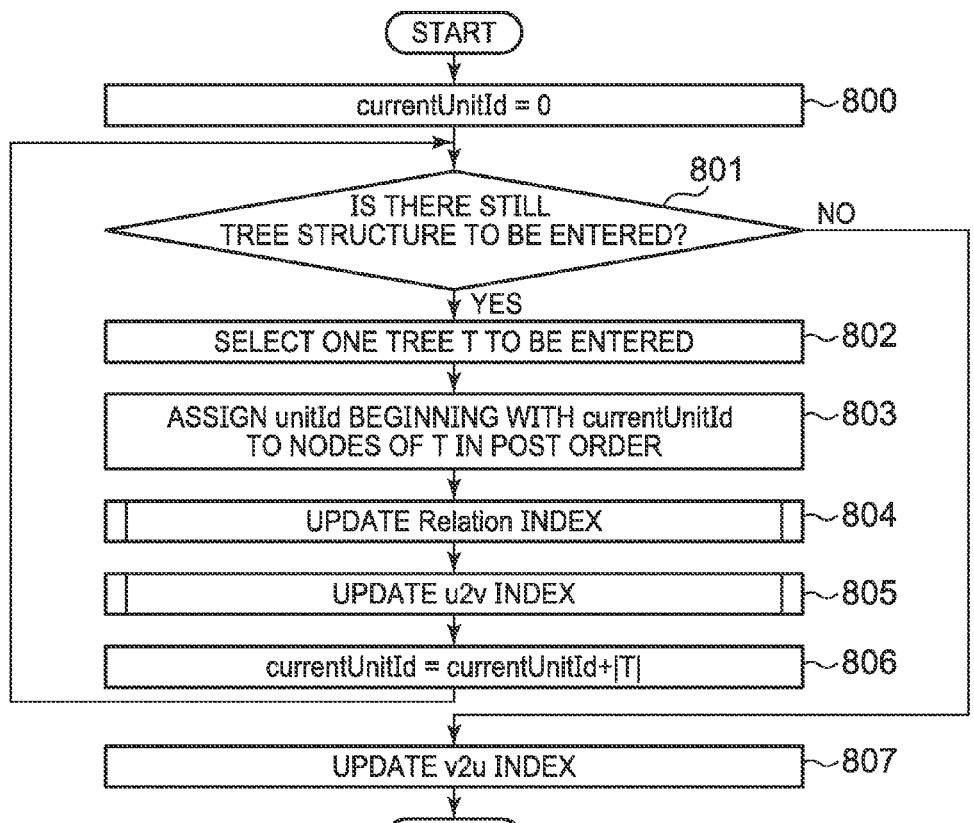
FIG. 8A is a flowchart of the entire processing of creating or updating an index.

FIG. 8A shows a flowchart of the entire processing of creating or updating an index, which is an embodiment of the present invention.

In step 800, a computer initializes a variable currentUnitId to 0. The variable currentUnitId is to store an initial value used when the computer assigns node IDs to a tree structure to be processed. The initialization to 0 indicates that the node ID assigned first is 0. According to one embodiment of the present invention, the process can replace a character string with a numerical value if the value is a character string.

In step 801, the computer determines whether there is still a tree structure to be processed. If there is the tree structure to be processed, the processing proceeds to step 802. If all tree structures have already been processed, the processing proceeds to step 807.

In step 802, the computer selects a tree structure used in subsequent steps (803 to 806). In the subsequent steps (803 to 806), processing is performed in units of a tree structure.

In step 803, the computer assigns node IDs in the post order. For a starting value of the node IDs, currentUniId is used.

In step 804, the computer creates or updates a relation index. The relation index and its processing will be described below.

In step 805, the computer creates or updates a u2v index. The u2v index and processing thereof will be described later. Either step 804 or step 805 can be performed earlier.

In step 806, the computer adds |T| to the variable "currentUnitId." The value obtained by the processing becomes an initial value used for assigning node IDs to a tree to be processed next.

In step 807, the computer creates or updates a v2u index. According to one embodiment of the present invention, the process can replace the numerical value with a character string after the v2u index is created or updated.

Figure 8B:
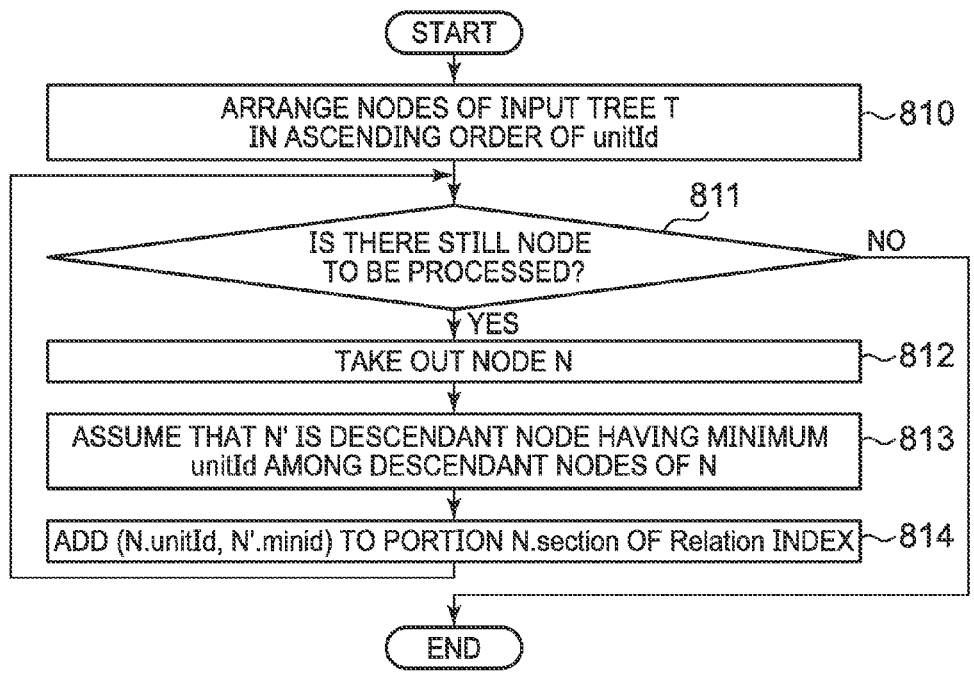
FIG. 8B is a flowchart of processing of creating or updating the relation index.

FIG. 8B shows a flowchart of processing of creating or updating the relation index, which is an embodiment of the present invention. FIG. 8B shows the details of step 804 of FIG. 8A. The flowchart is for one tree structure T.

In step 810, the computer arranges the nodes of the tree in ascending order of "unitId."

In step 811, the computer determines whether there still remains a node to be processed. If there is the node to be processed, the processing proceeds to step 812. If all nodes have already been processed, the processing is terminated and proceeds to step 805 of FIG. 8A.

In step 812, the computer picks a node N from the tree structure T.

In step 813, the computer selects a node having the minimum node ID among the descendant nodes of the node N picked in step 812. It is concluded that N' is the node having the minimum node ID.

In step 814, the computer adds the node ID of the node N picked in step 812 and the node ID of the node N' selected in step 813 to the relation index. The destination to which the node IDs are added is a location corresponding to the section set in the node N. The process can find the destination from the section pointer tree. The computer can obtain a pointer to the section from the section pointer tree and add the node ID of the node N and the node ID of the node N' at the end of the location pointed by the pointer in the relation index. In the case of a new section, a pointer pointing to the section is added to the section pointer tree. The computer updates the number of nodes and the row size, which are set items of the relation index.

Figure 8C:
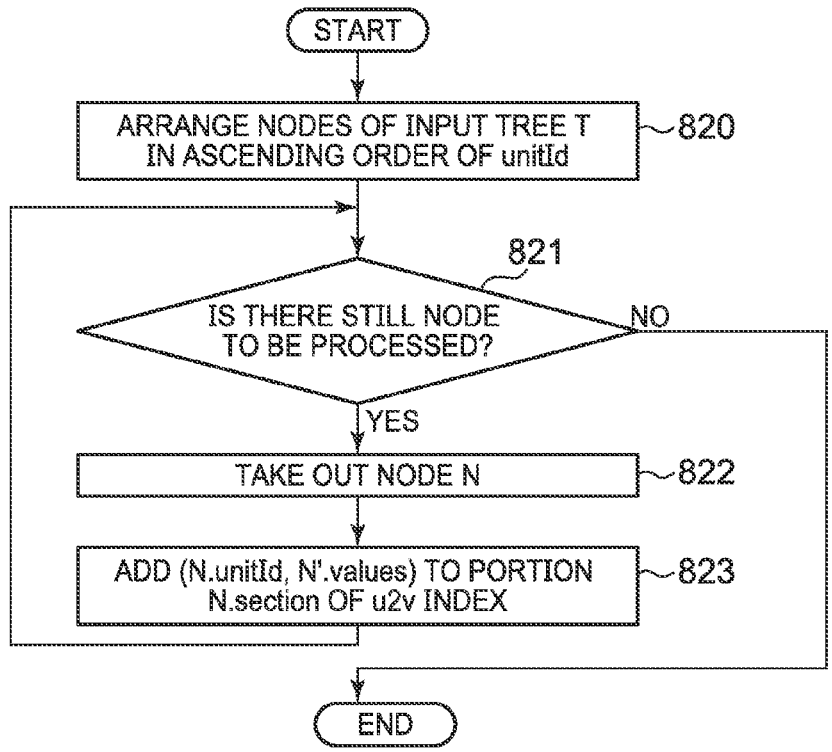
FIG. 8C is a flowchart of processing of creating or updating the u2v index.

FIG. 8C shows a flowchart of the process of creating or updating the u2v index, which is an embodiment of the present invention. FIG. 8C shows the details of step 805 of FIG. 8A. The flowchart is for one tree structure, T.

In step 820, the computer arranges the nodes of the tree in ascending order of unitId.

In step 821, the computer determines whether there still remains a node to be processed. If there is a node to be processed, the processing proceeds to step 822. If all nodes have already been processed, the processing is terminated and proceeds to step 806 of FIG. 8A.

In step 822, the computer picks a node N from the tree structure T.

In step 823, the computer adds the node ID of the node N picked in step 822, the values, and the number of values to the u2v index. The destination of the addition is a location corresponding to the section set in the node N. The destination can be found from the section pointer tree. The computer can obtain a pointer to the section from the section pointer tree and add the node ID of the node N, the values, and the number of values at the end of the location pointed by the pointer in the u2v index. In the case of a new section, a pointer pointing to the section is added to the section pointer tree. Differential compression is performed in this step, if it is needed. The computer updates the number of nodes and the row size, which are setting items of the u2v index.

Figure 8D:
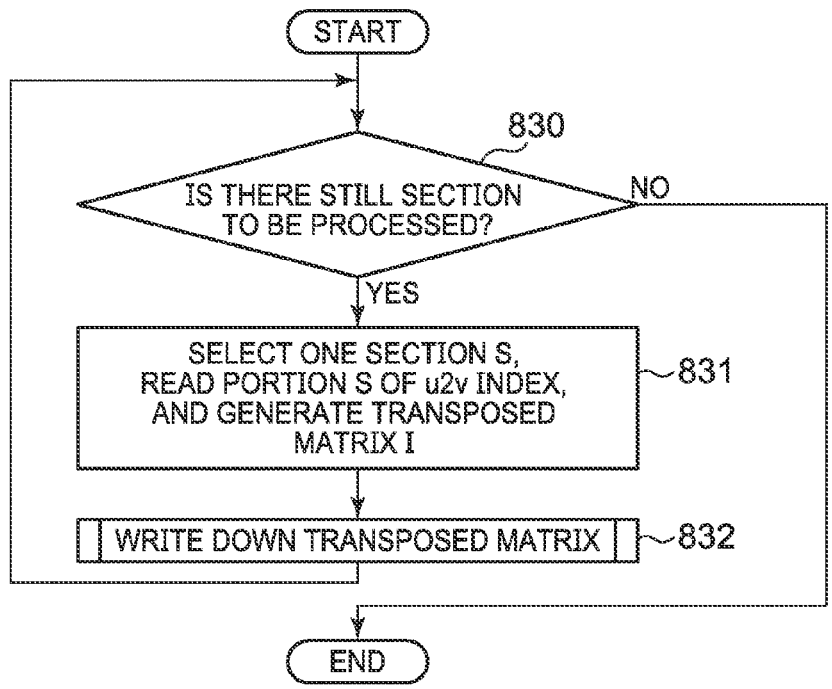
FIG. 8D is a flowchart of processing of creating or updating the v2u index.

FIG. 8D shows a flowchart for the process of creating or updating the v2u index, which is an embodiment of the present invention.

In step 830, the computer determines whether there still remains a section to be processed. If there is a section to be processed, the processing proceeds to step 831. If all sections have already been processed, the processing is terminated.

In step 831, the computer generates a transposed matrix I. The computer selects one selection S and reads a portion corresponding to the section S from the u2v index. Then, the computer generates the transposed matrix I from the read data. The transposed matrix will be described below.

In step 832, the computer records the transposed matrix. The transposed matrix is data in the u2v index converted into a format in which the node IDs of the nodes, including values, are stored in relationship to the values. The transposed matrix is a general matrix as an index of a search engine. The write processing will be described later. After the end of the write processing, the computer returns the processing to step 830.

The computer repeats the processing of steps 830 to 832 until no section to be processed remains.

Figures 8E, 8F:
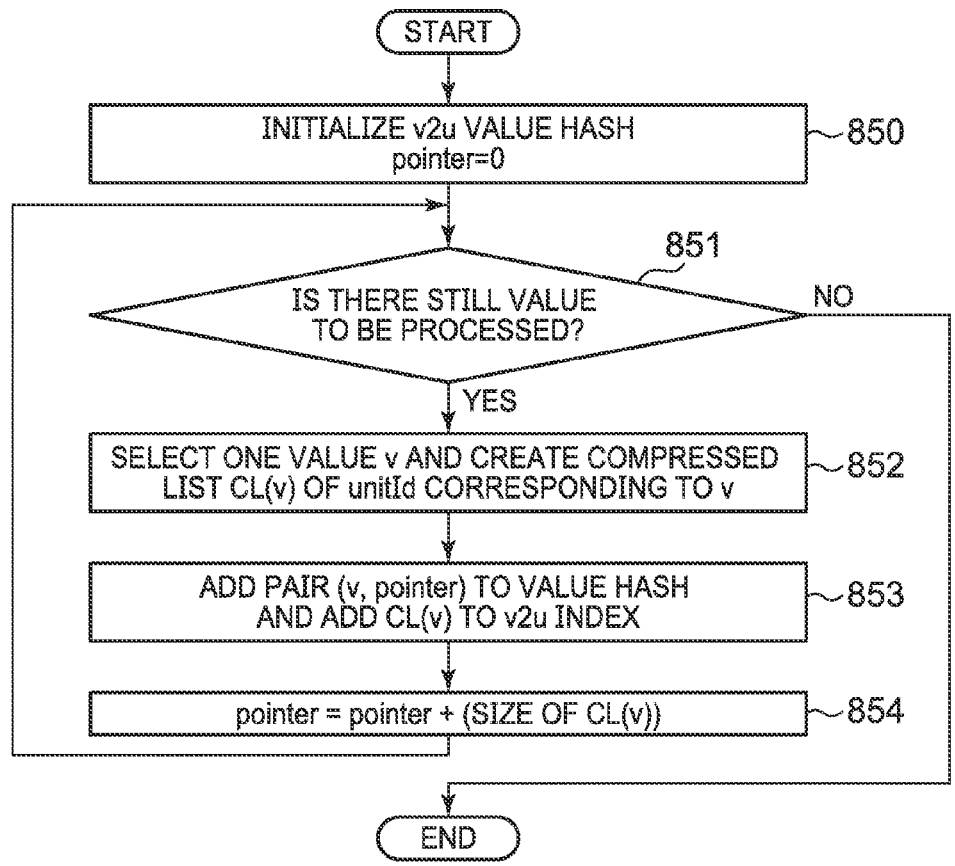
FIG. 8E is a diagram illustrating an example of a transposed matrix.
FIG. 8F is a flowchart of write processing of the transposed matrix.

FIG. 8E shows an example of the transposed matrix, which is an embodiment of the present invention.

Table 840 shows an example of data in the u2v index in a certain section. The example of the data corresponds to the data that has not been converted to the transposed matrix yet. Table 841 shows an example of data in Table 840 converted to the transposed matrix. In one embodiment of the present invention, the values included in the table can be represented by numerical values.

In Table 840, the value "Internet" is included in the row of node IDs 2, 5, 9, and 11. The value "PC" is included in the row of node ID 2. The value "phone" is included in the row of node IDs 2 and 9. The value "modem" is included in the row of node IDs 5 and 11. The value "keyboard" is included in the row of node ID 11. The representation of the relation is the transposed matrix shown in Table 841.

FIG. 8F shows a flowchart of the write processing of the transposed matrix, which is an embodiment of the present invention. The processing of the flowchart is performed for each section.

In step 850, the computer initializes the v2u value hash. The value hash means the hash structure 701 in FIG. 7A. The computer creates a new null value hash. The computer assigns 0 to the pointer which is a variable for setting a pointer to the value hash.

In step 851, the computer determines whether there still remains a value to be processed. If there is a value to be processed, the computer proceeds to step 852. If all values have already been processed, the computer proceeds to step 830 in FIG. 8D.

In step 852, the computer creates a compressed list CL(v). The compressed list CL(v) is data corresponding to each row of Table 702 in FIG. 7A. The computer selects one value v. The computer reads the node ID corresponding to the value v from the transposed matrix I generated in step 831. The computer creates the compressed list CL(v) by using the read node IDs, the number of node IDs, and the size of the node IDs and that of the number of node IDs. In one embodiment of the present invention, the node IDs are differentially compressed.

In step 853, the computer sets data to the value hash and the v2u index. The computer adds a pair of the value v and the pointer to the value hash. Moreover, the computer adds CL(v) to the v2u index. If there is no v2u index, the computer creates the v2u index.

In step 854, the computer adds the CL(v) size to the pointer. After the end of the processing of the step, the computer returns the processing to step 851. The computer repeats the processing of steps 851 to 854 until no value to be processed remains.

Figure 9A:
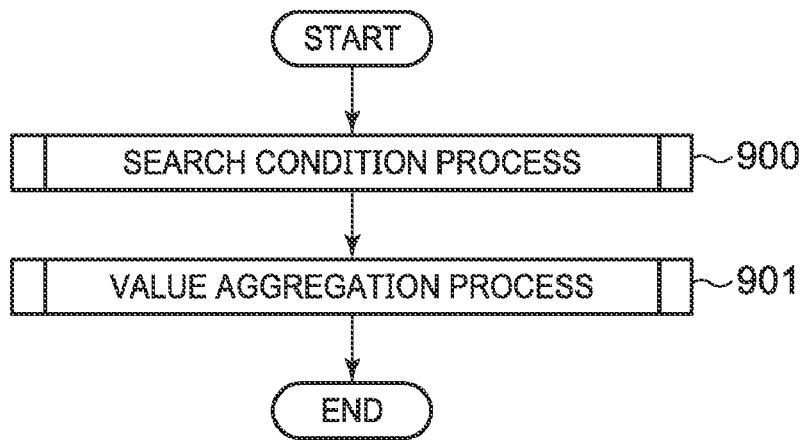
FIG. 9A is a flowchart of the main processing of an aggregation process.
Figure 9B:
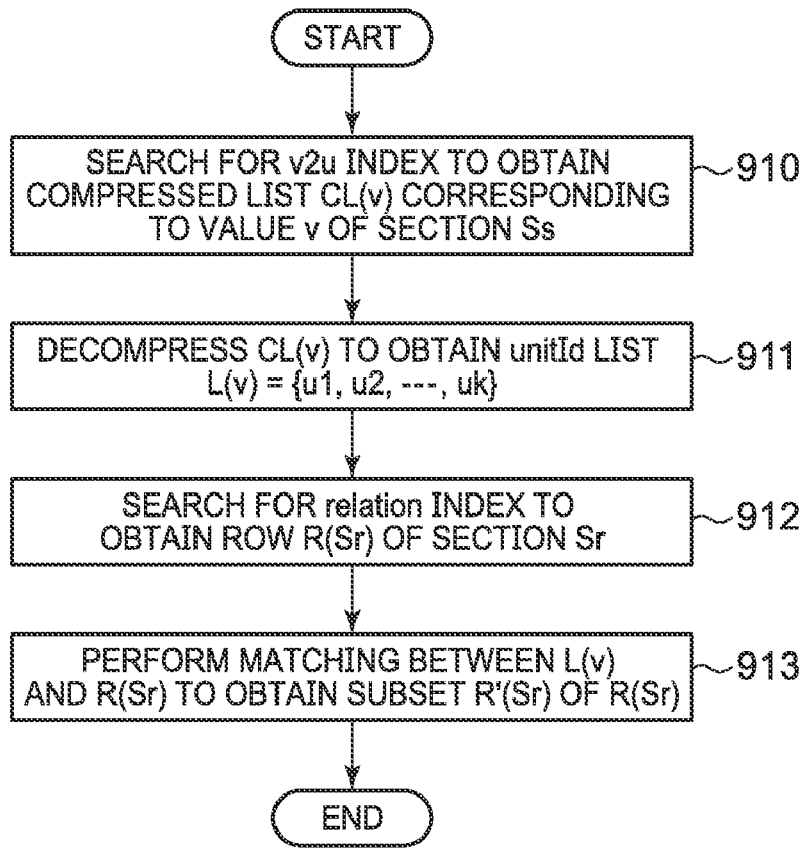
FIG. 9B is a flowchart of a search condition process.
Figure 9C:
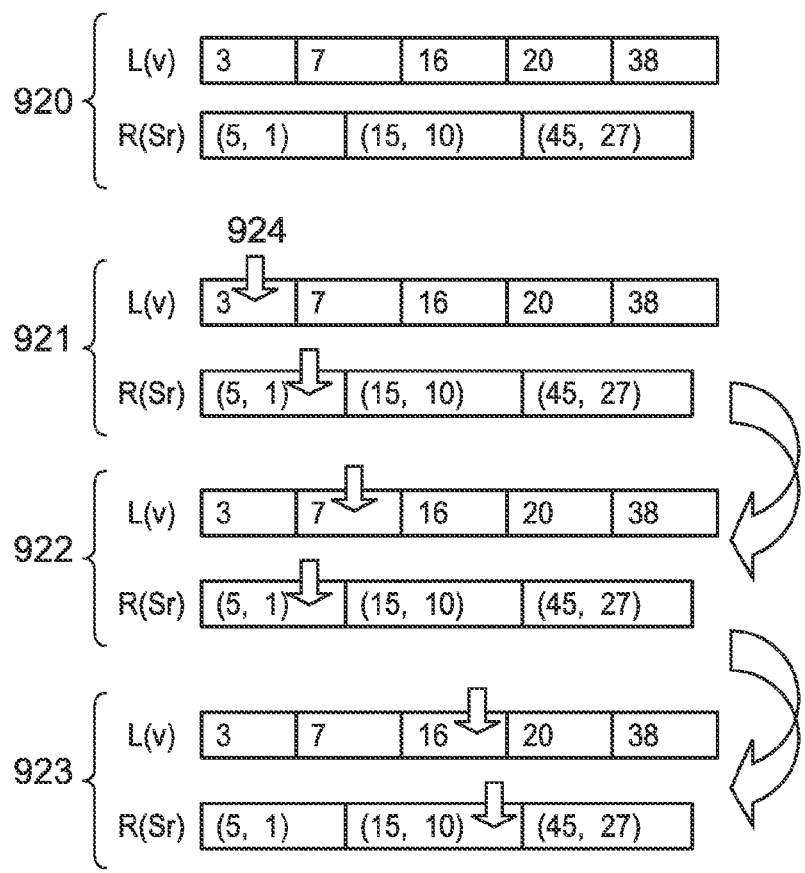
FIG. 9C is a flowchart of a matching process.

FIG. 9A to FIG. 9C show flowcharts of an aggregation process using indices, which is an embodiment of the present invention. Input parameters in the flowcharts are defined as described below.

A search condition value is taken to be v. The value v corresponds to, for example, a keyword, which is used for using a search engine. For example, value "phone" (telephone) is applicable. Moreover, it is also possible to use an a selected logical expression of the value, instead of a single value. An example of v is "phone and Internet."

Ss is taken to be a search condition section. Ss is the specification of a section including v and takes on the meaning only when Ss pairs with v. An example of Ss is an Answer section in the case where aggregation is performed for a tree in which there is the value "phone" in the Answer section.

Sr is taken to be a root section. Sr is the specification of a section of the root node in the tree structure which is the target of the aggregation. An example of Sr is "Document."

Sa is taken to be a section as the target of aggregation. Sa is the specification of a section including values to be aggregated. An example of Sa is a Noun section in the case where values in the Noun section are aggregated.

Sc is taken to be an aggregation unit section. Sc is the specification of a unit to which the aggregate function is applied and takes on the meaning when it is paired with Sa. An example of Sc is a Question section in the case where values of the Noun section are aggregated using the unit of the Question section.

The output of the aggregate process is represented by a list of pairs (v, f(v)) between v and a value f(v), which is the aggregate function f on v. Below, it is taken that f(v)=the occurrence number of v in Sc unit. A selected aggregate function can be used as f.

FIG. 9A is a flowchart showing the main processing of the aggregation process, which is an embodiment of the present invention. For the main processing, v, Ss, Sr, Sa, and Sc are provided as input parameters. In the main processing, a search condition process 900 and a value aggregation process 901 are performed.

FIG. 9B shows a flowchart of a search condition process 900, which is an embodiment of the present invention. In the search condition process 900, a value or a keyword can be found by using the v2u index and the relation index.

In step 910, the computer searches for the v2u index by using the section Ss to obtain a compressed list (hereinafter, referred to as CL(v)). In one embodiment, the search is sequentially performed.

In step 911, the computer decompresses CL(v) obtained in step 910 to obtain a node ID list (hereinafter, referred to as L(v)). The node ID list corresponds to a first list.

In step 912, the computer searches for the relation index to obtain a row of the section Sr (hereinafter referred to as R(Sr)). In one embodiment, the search is sequentially performed.

In step 913, the computer performs matching between L(v) and R(Sr) to obtain a subset of R(Sr) (hereinafter, referred to as R'(Sr)). The R'(Sr) corresponds to a second list.

FIG. 9C shows a flowchart of the matching process, which is an embodiment of the present invention. FIG. 9C shows the matching process between L(v) and R(Sr) as an example. The numerical values in the L(v) row represent node IDs of the nodes having v. For example, in a list 920, the numerical values of the node IDs are 3, 7, 16, 20, and 38. The numerical values in the R(Sr) row represent pairs of the node ID of a node having the section Sr and the node ID of the node having the minimum node ID among the descendant nodes of the node having the node ID. For example, in the list 920, (5, 1), (15, 10), and (45, 27) are the pairs of node IDs. The notation (5, 1) means that 5 is the node ID of the section Sr and 1 is the minimum node ID among the node IDs of the descendant nodes of the node whose node ID is 5. The matching processes of other data are the same as described above.

The procedure for the matching process in FIG. 9C is as described below. The computer sets a cursor 924 to the beginning of each list (L(v), R(Sr)). The computer checks that the node ID of L(v) pointed to by the cursor is within the range of the pair of values indicated by R(Sr), and if so, the computer stores the pair in the memory. In the example of the list 921, which is the target of matching, 3 is within the range (5, 1) and therefore the computer stores (5, 1) in the memory 921.

After that, the computer moves the cursor on L(v) to the position where the value of the node ID exceeds the range of the pair of the current R(Sr) (namely, 7) 922. Subsequently, the computer moves the cursor on R(Sr). With the repetition of the above, all pairs satisfying the condition are obtained. The whole of the pairs is taken to be R'(Sr). In the example of FIG. 9C, R'(Sr)={(5, 1), (45, 27)}.

Figure 9D:
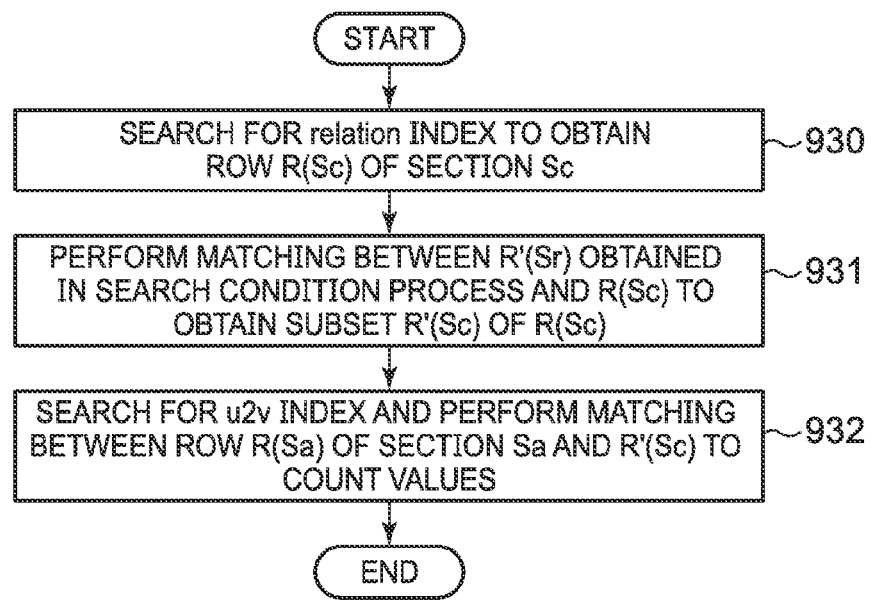
FIG. 9D is a flowchart of a value aggregation process.

FIG. 9D shows a flowchart of a value aggregation process, which is an embodiment of the present invention. In step 930, the computer searches for the relation index to obtain a section Sc row, referred to as R(Sc). The search is sequentially performed.

In step 931, the computer performs matching between R'(Sr) and R(Sc) to obtain a subset of R(Sc) (hereinafter, referred to as R'(Sc)).

In step 932, the computer searches for the u2v index to obtain a section Sa row (hereinafter, R(Sa)). The search can be implemented not only as a sequential access, but also as a random access. Matching is performed between the obtained R(Sa) and R'(Sc). The computer obtains the v list satisfying the search condition of the search formula for performing the aggregation by the matching. The v list corresponds to a third list. The computer counts values by using the v list.

In the case of searching for the u2v index in step 932, the computer is allowed to perform a random access as well as a sequential access. If the first search condition value v is extreme (strict) and the number of nodes to be counted is relatively low, the random access can be faster than the sequential access in some cases.

Figure 9E:
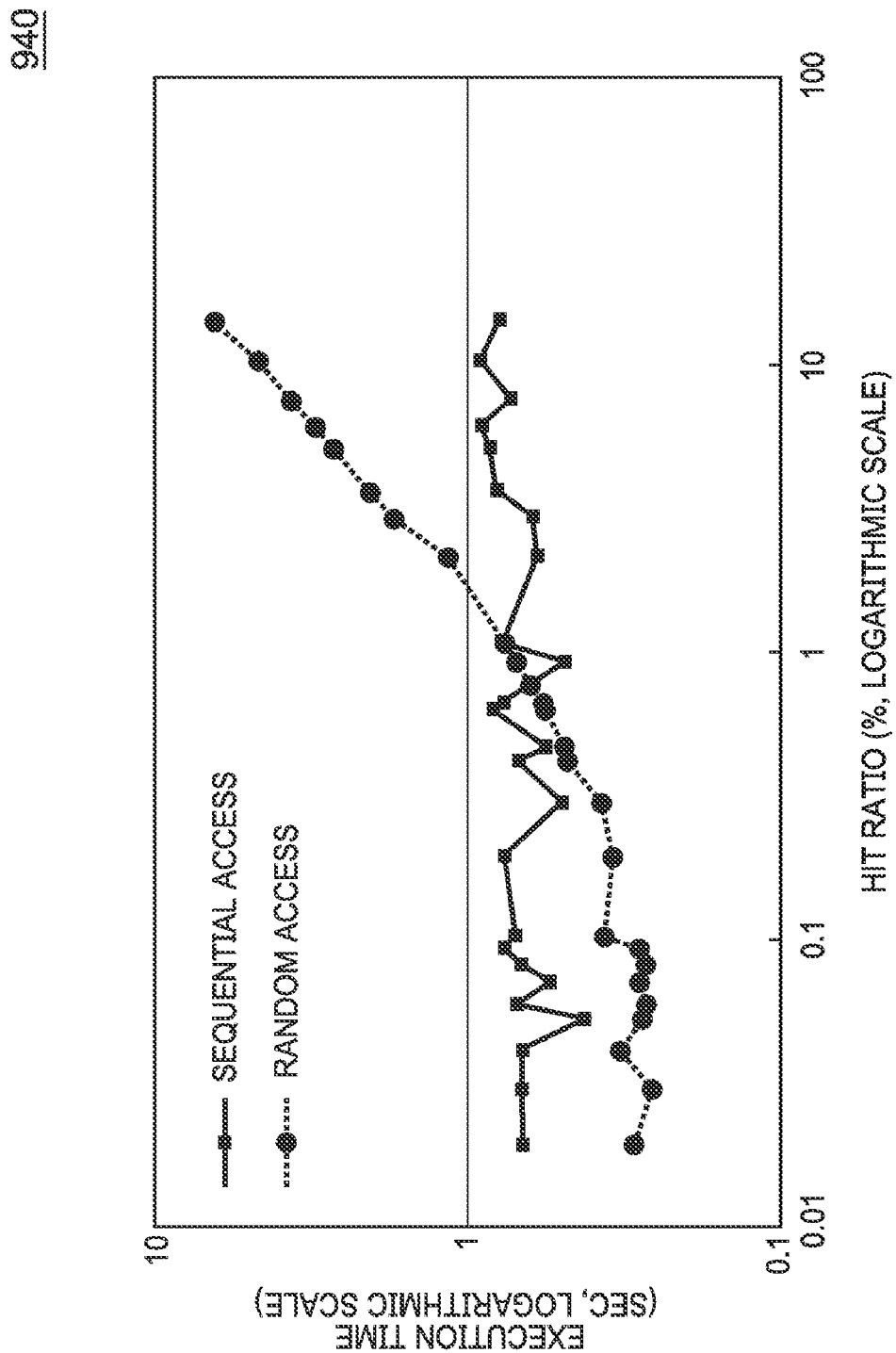
FIG. 9E is a relationship between a hit ratio and execution time in a sequential access and in a random access.

FIG. 9E shows a relationship between the hit ratio and execution time in the sequential access and in the random access, which is an embodiment of the present invention. The abscissa axis of a graph 940 represents the hit ratio. In cases where the relationship between Sr and Sa is known, the process can estimate which of the sequential access and the random access is more advantageous by using the following switching algorithm, if the search condition is known.

If the ratio of Sr to Sa is 1:1, the symbols are defined as follows:
$T_k$: Seek time in the u2v index by random access
$T_q$: Read time per unit by sequential access
N: The number of units in the u2v index of Sa
$N_v$: The number of units satisfying a search formula in the u2v index of Sa Assuming that $T_S$ and $T_R$ are the execution time for sequential access and for random access, $T_S$ and $T_R$ are calculated as follows:

$$T_S = T_k + N*T_q$$

$$T_R = N_v *(T_k + T_q)$$

If $T_S = T_R$ is solved, the process can determine the value of $N_v$ for providing a threshold value for switching.

$$N_v \sim N/(1+(T_k/T_q))$$

Figures 9F, 9G:
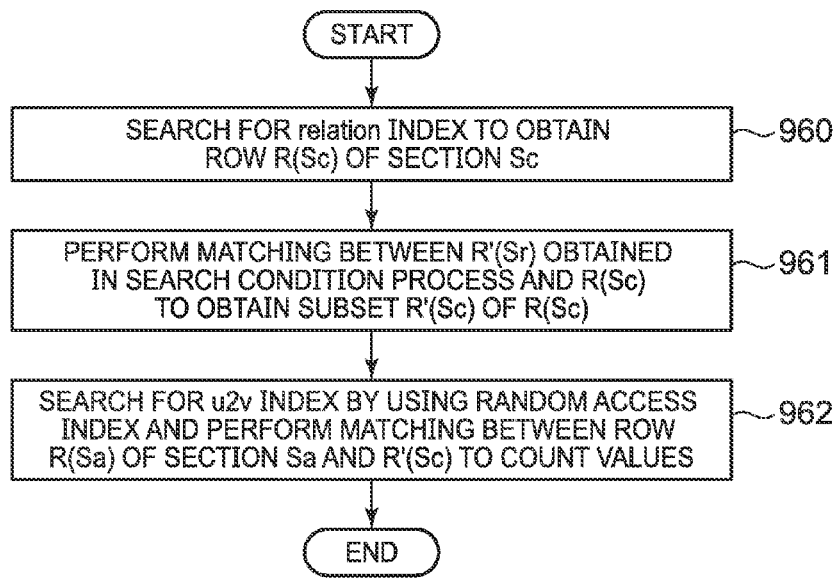
FIG. 9F is a conceptual schema of a random access index.
FIG. 9G is a flowchart of a value aggregation process when a random access is performed.

FIG. 9F shows a conceptual schema of a random access index, which is an embodiment of the present invention. The random access index is used for an execution of a random access. The random access index sequentially stores node IDs and entry locations in the u2v index required to be accessed for the corresponding sections, respectively. The conceptual schema of the random index is shown in Table 951. Table 950 is the same as Table 501 of the conceptual schema of the u2v index described above.

Table 951 is an example of one section. Each row of Table 951 represents a node included in one section. The first column represents a unit ID (which is the same as the node ID). The second column represents a pointer for pointing to an entry location having the information of the node in the u2v index 950. The pointer is represented by the number of bytes from the beginning of the corresponding section. Both of the first and second columns are fixed-length. For example, the process can set the first column to 4-byte long and the second column to 8-byte long.

FIG. 9G shows a flowchart of a value aggregation process 901 when a random access is performed, which is an embodiment of the present invention.

Step 960 follows the same processing as step 930. Step 961 follows the same processing as step 931. Step 962 corresponds to step 932. Step 962 differs from step 932 only in that the computer performs a random access by using the random access index, instead of the sequential access, when searching for the u2v index. Regarding the method of searching for the u2v index by using the random access index, the process can use a selected method only if the random access index is an index for supporting a random access. For example, there is a method of obtaining a pointer by a binary search with respect to a node ID within the random access index or a method of obtaining a pointer by applying a node ID in the random access index to a B-tree. The computer is allowed to omit the reading of node IDs not included in the result of aggregation by performing the random access when reading the node IDs of the u2v index.

In text mining, document data is accompanied by a large amount of processing results (extracted keywords such as nouns and verbs). In cases where the processing results are stored in a database, it is known that the number of records significantly increases relative to the number of original documents.

The following describes a result of a comparison in performance between a prototype of the embodiment of the present invention and PostgreSQL which is widely used as a relational database. The comparison in performance has been performed by using two types of data. The data is log data of a PC call center and data taken from life science. It is taken here that the comparison performed by using the log data of the PC call center is Experiment 1 and the comparison performed by using the data from life science is Experiment 2.

EXPERIMENT 1

The number of data used in Experiment 1 is 324677. A tree structure 1000 in FIG. 10A represents a structure of the data used in Experiment 1. The number of distinct elements of a ternary of the section, the node ID, and the value is 25150042.

The table schema of PostgreSQL is created by a subdivision method which is currently widely used. Moreover, the table schema is adapted to have a structure suitable for handling minimum data for speed enhancement. More specifically, the PostgreSQL table has been created for each section. The table has two INT columns. The node ID of a parent node and a node ID have been set in the table column corresponding to the nodes whose section is Document, Question, or Answer. The node ID of a parent nod and values have been set in the table column corresponding to the nodes other than the nodes whose section is Document, Question, or Answer. In cases where there is a plurality of values, records are prepared according to the number of the values. In addition, a B-tree index is stretched in two directions, namely from the first column to the second column and from the second column to the first column.

A computer used in Experiment 1 includes two CPUs of Pentium™ 4-3 GHz and 3 GB of memory. Moreover, the OS for the computers is Linux RHEL3.0.

FIG. 10B shows nine types of queries used in Experiment 1. The term "in some place in . . . " described in Table 1001 means "in some place of the descendant nodes of a node having a certain section." All totals to be counted are indicated by "count." The values used as v in Table 1001 are different from each other in frequency, e.g., 45437, 16293, and 1340. The frequency is measured when the node whose section is Document is used as a unit. The various frequencies are used for the purpose of observing how the performance will change when the search condition is varied.

Furthermore, the following describes SQLs corresponding to the queries on Table 1001. The SQLs are the queries having been converted to those for PostgreSQL.

Q1:
select x.value, count(distinct z.value) as freq from L12 as x, B8 as z where x.pid=z.value group by x.value order by freq desc Q2-1, Q2-2, Q2-3, Q2-4:
select x.value, count(distinct z.value) as freq from L12 as x, L12 as y, B8 as z where x.pid=z.value and y.pid=z.value and y.value=V group by x.value order by freq desc. In the above, a keyword ID corresponding to the searched keyword is entered into V of y.value=V.

Q3-1, Q3-2, Q3-3, Q3-4:
select x.value, count(distinct w.value) as freq from L12 as x, L12 as y, M9 as v, M19 as w, B8 as z where x.pid=w.value and w.pid=z.value and z.value=v.pid and v.value=y.pid and y.value=V group by x.value order by freq desc.

In the above, a keyword ID corresponding to the searched keyword is entered into V of y.value=V. Moreover, B8, M9, M19, and L12 represent tables corresponding to the sections "Document," "Question," "Answer," and "Noun."

Figure 10C:
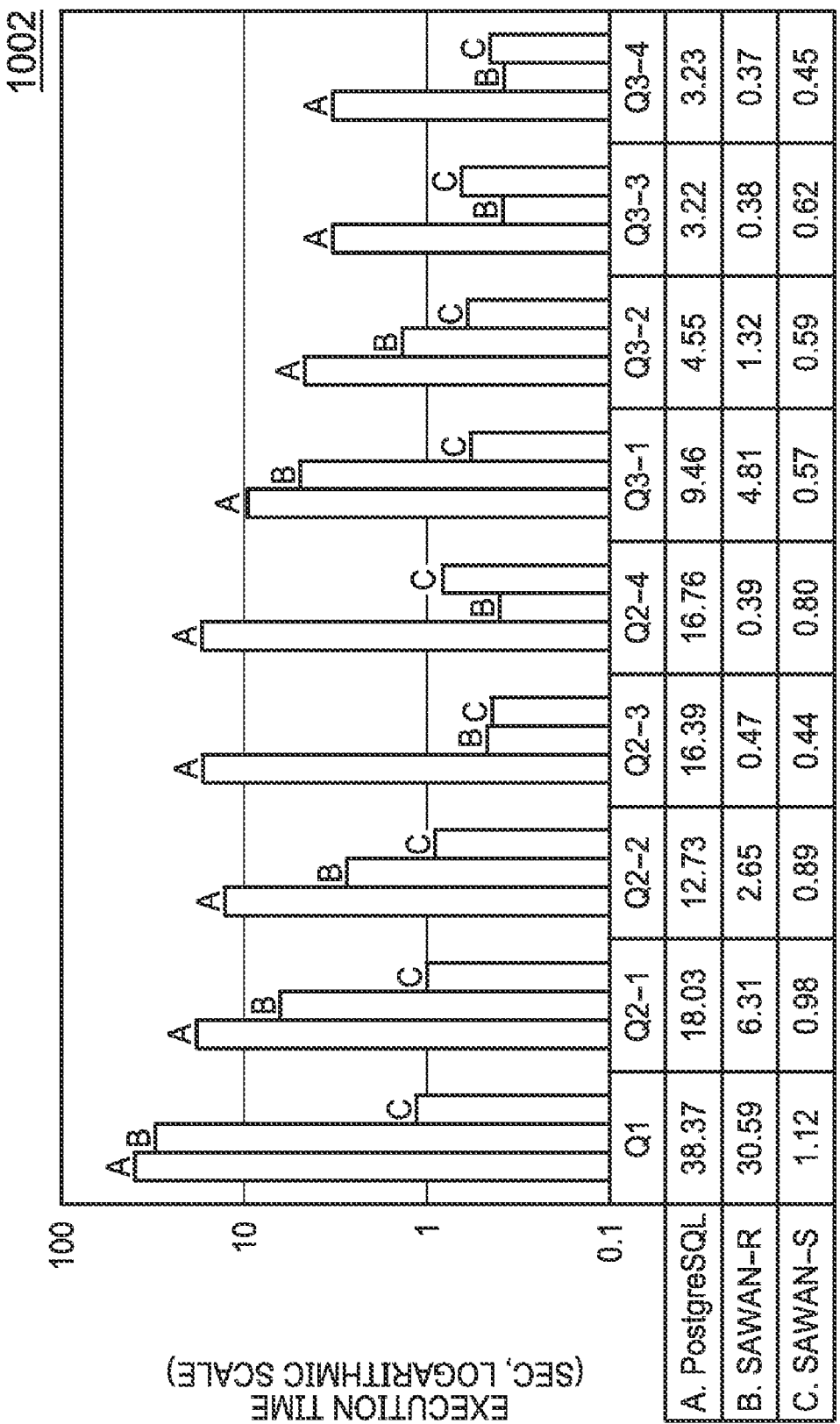
FIG. 10C is a graph illustrating a result of Experiment 1.

FIG. 10C shows the result of Experiment 1. The abscissa axis of the graph 1002 represents test cases. The test cases correspond to the query numbers on Table 1001. The ordinate axis of the graph 1002 represents the execution time, sec, logarithmic scale, of the queries. The term "PostgreSQL" in the graph 1002 represents the processing time for the aggregation when PostgreSQL is used.

The term "SAWAN-R" represents the processing time for the aggregation when using random access, which is an embodiment of the present invention. The term "SAWAN-S" represents the processing time for the aggregation when using sequential access, which is an embodiment of the present invention. In the aggregation with the use of the sequential access, the processing time is around one sec, 0.4 to 1.1 sec, in all test cases. Moreover, in the aggregation with the use of random access, the processing time is 0.4 to 30.1 sec. On the other hand, in the aggregation with the use of PostgreSQL, the processing time is approximately 3.2 sec in the example of query Q3-3, which is the test case whose processing time is the minimum. Furthermore, the processing time is approximately 38.4 sec in the example of query Q1, which is the test case whose processing time is the maximum.

The result of Experiment 1 suggests that the performance of the aggregation with the use of the sequential access is independent of the search type. Moreover, it suggests that the aggregation with the use of PostgreSQL is superior to others only when a specific search is performed. It is caused by a random access including B+-tree implementation.

EXPERIMENT 2

The data used in Experiment 2 is from life science and the number of data is 700071. It is about twice as much as the number of the data used in Experiment 1. A tree structure 1003 in FIG. 10D represents a structure of the data. The number of distinct elements of a ternary of the section, the node ID, and the value is 163994676. It is more than approximately 6.5 times higher than the number of distinct elements of the data used in Experiment 1. The reason that the number of distinct elements is high in comparison with the ratio of the number of data, namely 2.2, equal to 700071 divided by 324677, is that one document from life science contains a larger quantity of text and therefore also contains a larger number of keywords.

The table schema of PostgreSQL, queries, and SQLs corresponding to the queries used in Experiment 2 are the same as those used in Experiment 1 except that "Question" of Experiment 1 is replaced with "Title", and "Answer" of Experiment 1 is replaced with "AbstractText." Note that, however, selected values are used for the keywords so as to be appropriate for the experiment from data from life science. The computer structure used in Experiment 2 is the same as in Experiment 1.

Figure 10F:
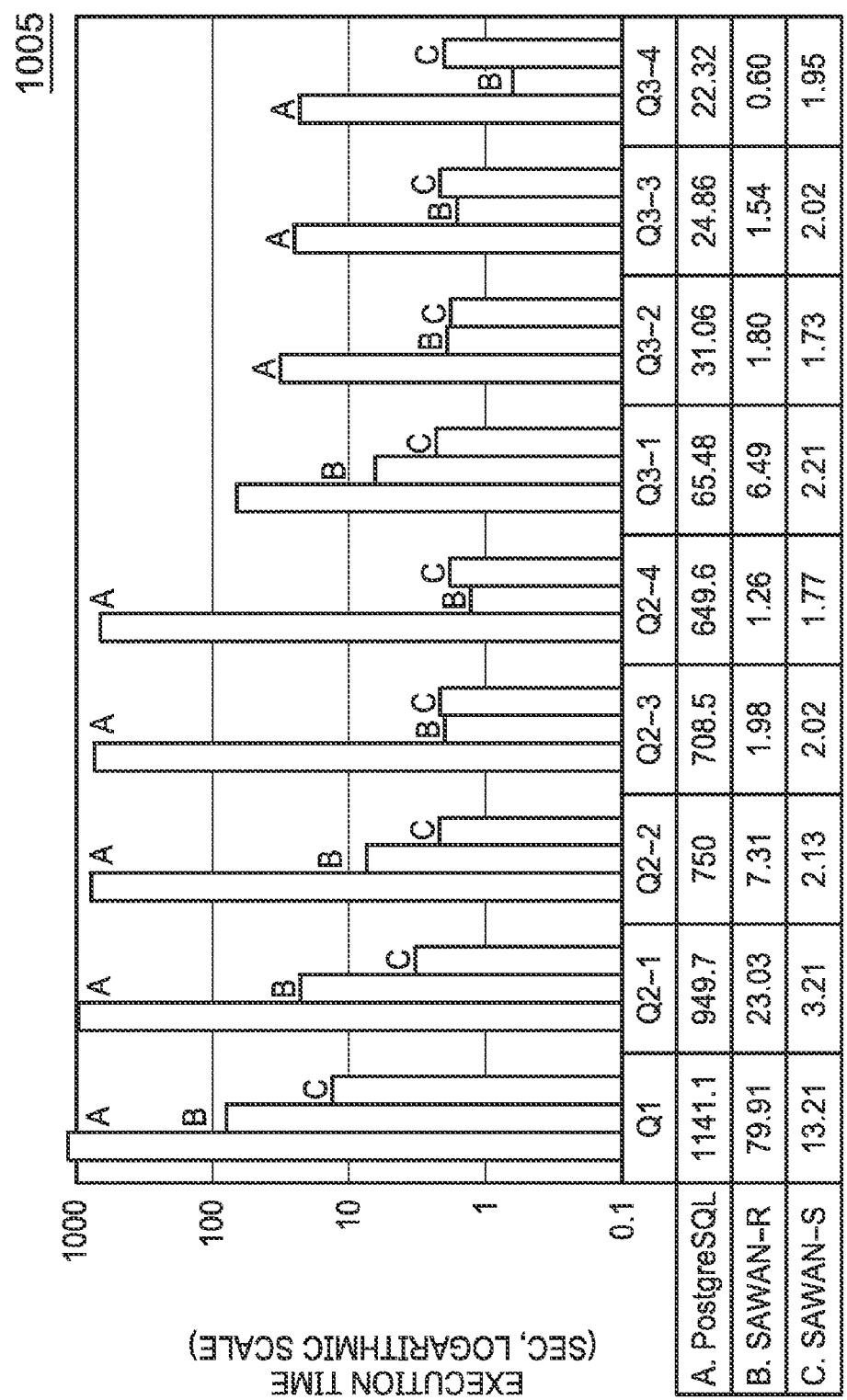
FIG. 10F is a graph illustrating a result of Experiment 2.

FIG. 10E shows nine types of queries used in Experiment 2. FIG. 10F shows the result of Experiment 2. The abscissa axis of a graph 1005 represents test cases. The test cases correspond to the query numbers on Table 1004. The ordinate axis of the graph 1005 represents the execution time, sec, logarithmic scale, of the queries.

The term "PostgreSQL" in the graph 1005 represents the processing time for the aggregation when PostgreSQL is used. The term "SAWAN-R" represents the processing time for the aggregation when using random access. The term "SAWAN-S" represents the processing time for the aggregation when using sequential access. In the aggregation with the use of the sequential access which is an embodiment of the present invention, the processing time is 1.7 to 13.2 sec. Moreover, in the aggregation with the use of the random access which is an embodiment of the present invention, the processing time is 0.6 to 79.9 sec. On the other hand, in the aggregation with the use of PostgreSQL, the processing time is 22.3 to 1141.1 sec. In the case where no keyword is used for the search as in the query Q1, it takes 1000 sec or more for the processing of performing aggregation by using PostgreSQL.

The following describes two features of the aggregation process according to an embodiment of the present invention, which have resulted from Experiments 1 and 2. The computer can complete the aggregation process according to the embodiment of the present invention in seconds even if the search condition is not specified. Moreover, a random access has the potential to show an excellent performance when the search condition is selective.

From the above experimental results, it is understood that the embodiment of the present invention is effective. The reason why the time taken for the aggregation to be almost constant when using the sequential access, which is one embodiment of the present invention, is that almost all of the time is spent for sequential reading of the index. The sequential reading is independent of the search condition. Although the operation speed increases as a result of the effect of selectivity as the search condition is stricter in PostgreSQL, the operation speed is twice or more as slower as the sequential access, even in the case where the maximum effect is achieved.

FIG. 10G shows the time taken for the index construction. Table 1006 shows the time taken for the index creation on PostgreSQL and the time taken for the index creation according to the embodiment of the present invention. The time taken for the index creation on PostgreSQL does not include the time for syntax analysis of an XML file and the time for assigning IDs to keywords. Moreover, data in the CSV format is used for input data. The data in the CSV format is excellent in importing data into a database by using Java and JDBC which is the database connection API. On the other hand, the time taken for the index creation according to the embodiment of the present invention includes the time for syntax analysis of an XML file and the time for assigning IDs to keywords. The time taken for the index construction according to the embodiment of the present invention is shorter than that for the index construction in RDB.

Since an index can be created incrementally in the embodiment of the present invention, it is possible to prepare a plurality of computers to create the index on the computers independently of each other. More specifically, the present invention enables the parallelization of the systems and processes. A user is allowed to use an existing parallelization framework such as MPI, which is the standard of parallel programming.

Moreover, in the embodiment of the present invention, the computers execute the aggregation independently of each other during the execution of the aggregation. Finally, the aggregation server is capable of merging the results. The aggregation server can be prepared separately or a computer can be selected as the aggregation server from the above computers.

Figure 11:
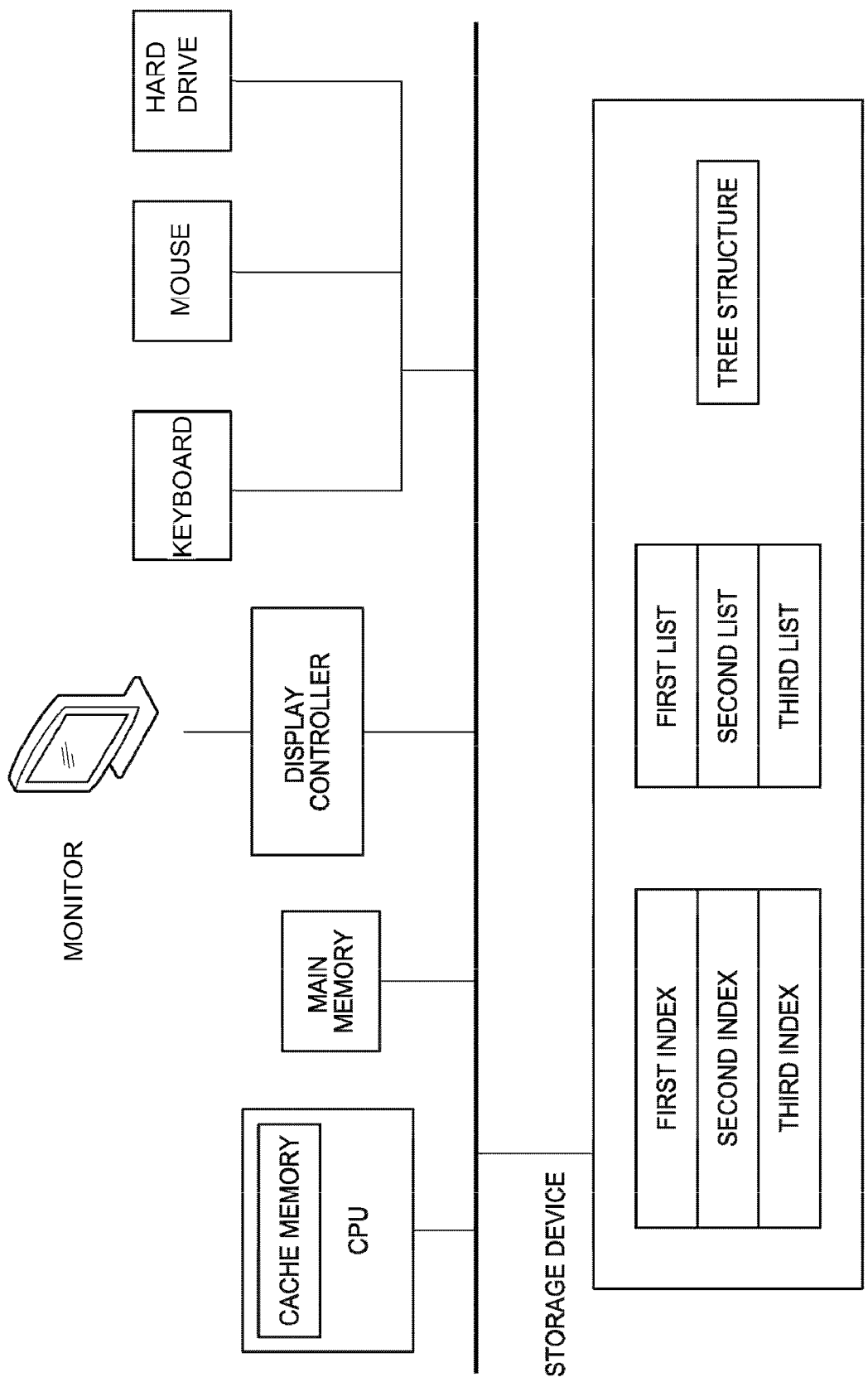
FIG. 11 is a configuration diagram of a computer.

FIG. 11 shows an example of a computer that can be used in the embodiment of the present invention. The computer includes a CPU and a main memory, which are connected to a bus. The CPU is preferably based on a 32-bit or 64-bit architecture, and the system can use, for example, Xeon™ series, Core™ series, Pentium™ series, and Celeron™ series manufactured by Intel, Phenom™ series and Athlon™ series manufactured by AMD. The CPU can further include an internal cache memory. A display such as an LCD monitor is connected to the bus via a display controller. The display is used to display information on the computer connected to the network via a communication line and information on software operating in the computer on an appropriate graphic interface for computer management. In addition, a hard disk, hard drive, or a silicon disk and a CD-ROM or DVD drive are connected to the bus via an IDE or SATA controller.

The hard disk drive, or hard drive, stores an operating system, a program providing Java™ processing environment such as J2EE, other programs, and data so as to be loadable into the main memory. According to one embodiment of the present invention, the hard disk drive stores the u2v index, the relation index, the v2u index, and data generated from the above indices in order to be used for the aggregation such as, for example, a first list, a second list, a third list, and tree structures.

The CD-ROM, DVD, or BD drive is used to additionally installing a program from a CD-ROM, DVD-ROM, or BD to the hard disk drive, if necessary. A keyboard and a mouse are further connected to the bus via a keyboard/mouse controller.

A communication interface, which conforms to, for example, the Ethernet™ protocol, is connected to the bus via a communication controller and assumes the role of physically connecting the computer and the communication line to provide the TCP/IP communication protocol of the communication function of the operating system of the computer with a network interface layer. The communication line environment can be a wired LAN environment or a wireless LAN environment based on the wireless LAN connection standard such as, for example, IEEE 802.11a/b/g/n.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer system for creating an index to aggregate data in at least one tree structure including at least one node, in which each of the nodes includes one label indicating the type of the node and zero or more values, the computer system comprising:
    a storage device, which includes:
    a node ID assignment processing unit for assigning node IDs to the nodes in a post order;
    a first index creation processing unit for creating a first index having one or more sets of data including the node ID of each of the nodes and the values included in the node, wherein the one or more sets of data are generated for each of the labels;
    a second index creation processing unit for creating a second index having one or more sets of data including the node ID of each of the nodes and the node ID of a descendant node having the minimum node ID among at least one descendant node of the node, wherein the one or more sets of data are generated for each of the labels; and
    a third index creation processing unit for creating a third index having one or more sets of data including the node IDs of one or more nodes including specific values, wherein the one or more sets of data are generated for each of the specific values for each of the labels;
    wherein the first, the second, and the third index creation processing units create the index to aggregate data in the at least one tree structure including at least one node.

2. The computer system according to claim 1, wherein the first index is an electronic file in which are sequentially stored the sets of data including the node ID of each of the nodes and the values included in the node.

3. The computer system according to claim 1, wherein the second index is an electronic file in which are sequentially stored the sets of data including the node ID of each of the nodes and the node ID of the descendant node having the minimum node ID among at least one descendant node of the node.

4. The computer system according to claim 1, wherein the third index is an electronic file in which are sequentially stored the one or more sets of data including the node IDs of the one or more nodes including the specific values.

5. The computer system according to claim 1, wherein the storage device further comprises:
    a label ID assignment processing unit for assigning a label ID to each of the labels.

6. The computer system according to claim 1, wherein the storage device further comprises:
    a fourth index creation processing unit for creating a fourth index in which are stored sets of data including the node ID of each of the nodes and a pointer associated with the node ID, wherein the pointer points to a position of data having the node ID in the one or more sets of data stored in the first index.

7. The computer system according to claim 1, further comprising:
    a receiving processing unit for receiving a search formula for performing the aggregation;
    a first list acquisition processing unit for acquiring a first list including node IDs of one or more nodes each having a value which is a search target of the search formula by using the value which is the search target of the search formula and by using an index having one or more sets of data including the node IDs of the one or more nodes including specific values, wherein the one or more sets of data are generated for each of the specific values for each of the labels;
    a second list acquisition processing unit for acquiring a second list including one or more root node IDs of root nodes in tree structures having one or more descendant nodes each having the value which is the search target of the search formula by using the acquired first list and by using an index having one or more sets of data including the node ID of each of the nodes and the node ID of a descendant node having the minimum node ID among at least one descendant node of the node, wherein the one or more sets of data are generated for each of the labels; and
    a search processing unit for searching for the value which is the search target of the search formula on the basis of the acquired second list, wherein the value which is the search target of the search formula corresponds to at least one keyword.

8. The computer system according to claim 7, further comprising:
- a third list acquisition processing unit for acquiring a third list including one or more values of one or more nodes that satisfy a search condition of the search formula by using the acquired second list and by using an index having one or more sets of data including the node ID of each of the nodes and values included in the node, wherein the one or more sets of data are generated for each of the labels; and
- a calculation processing unit for finding a result of the search formula on the basis of the acquired third list.

9. A method of creating an index for aggregating data in at least one tree structure including at least one node in which each of the nodes includes one label indicating the type of the node and zero or more values, in a computer system having a central processing unit, a memory, and a storage unit for storing tree-structured data, the method comprising the steps of:
- reading information of the nodes into the memory and assigning node IDs to the nodes whose information has been read in a post order;
- creating a first index having one or more sets of data including the node ID of each of the nodes and the values included in the node;
- storing the created first index into the storage unit, wherein the one or more sets of data are generated for each of the labels;
- creating a second index having one or more sets of data including the node ID of each of the nodes and the node ID of a descendant node having the minimum node ID among at least one descendant node of the node;
- storing the created second index into the storage unit, wherein the one or more sets of data are generated for each of the labels;
- creating a third index having one or more sets of data including node IDs of one or more nodes including specific values; and
- storing the created third index into the storage unit, wherein the one or more sets of data are generated for each of the specific values for each of the labels, wherein the steps are performed by the central processing unit.

10. The method according to claim 9, wherein the step of storing the first index into the storage unit further includes a step of sequentially storing the sets of data including the node ID of each of the nodes and the values included in the node.

11. The method according to claim 9, wherein the step of storing the second index into the storage unit further includes a step of sequentially storing the sets of data including the node ID of each of the nodes and the node ID of the descendant node having the minimum node ID among at least one descendent node of the node.

12. The method according to claim 9, wherein the step of storing the third index into the storage unit further includes a step of sequentially storing the one or more sets of data including the node IDs of the one or more nodes including the specific values.

13. The method according to claim 9, further comprising the step of assigning a label ID to each of the labels.

14. The method according to claim 9, further comprising the step of compressing the values in the first index or the node IDs in the third index.

15. The method according to claim 9, further comprising the step of replacing a value which is a character string with a numerical value when the value is the character string before creating the first index and replacing the numerical value with the character string after creating the third index.

16. The method according to claim 9, further comprising the step of creating a fourth index in which are stored sets of data including the node ID of each of the nodes and a pointer associated with the node ID, wherein the pointer points to a position of data having the node ID in the one or more sets of data constituting the first index.

17. A method of aggregating data in at least one tree structure including at least one node, in which each of the nodes includes one label indicating the type of the node and zero or more values and node IDs are assigned to the nodes, in a computer system having a central processing unit, a memory, and a storage unit for storing tree-structured data in a post order, the method comprising the steps of:
- receiving a search formula for performing the aggregation and storing the received search formula into the memory;
- acquiring a first list including node IDs of one or more nodes each having a value which is a search target of the search formula by using the value which is the search target of the search formula and by using an index having one or more sets of data including the node IDs of the one or more nodes including specific values;
- storing the acquired first list into the storage unit, wherein the one or more sets of data are generated for each of the specific values for each of the labels;
- acquiring a second list including one or more root node IDs of root nodes in tree structures having one or more descendant nodes each having the value which is the search target of the search formula by using the acquired first list and by using an index having one or more sets of data including the node ID of each of the nodes and the node ID of a descendant node having the minimum node ID among at least one descendant node of the node;
- storing the acquired second list into the storage unit, wherein the one or more sets of data are generated for each of the labels; and
- searching for the value which is the search target of the search formula on the basis of the acquired second list, wherein the value which is the search target of the search formula corresponds to at least one keyword, wherein the steps are performed by the central processing unit.

18. The method according to claim 17, further comprising the steps of:
- acquiring a third list including one or more values of one or more nodes that satisfy a search condition of the search formula by using the acquired second list and by using an index having one or more sets of data including the node ID of each of the nodes and values included in the node;
- storing the acquired third list into the storage unit, wherein the one or more sets of data are generated for each of the labels; and
- finding a result of the search formula on the basis of the acquired third list.

19. The method according to claim 18, wherein the third list is acquired by a sequential access using an index having one or more sets of data including the node ID of each of the nodes and the values included in the node.

20. The method according to claim 18, wherein the third list is acquired by a random access using an index having one or more sets of data including the node ID of each of the nodes and the values included in the node and an index that stores sets of data including the node ID of each of the nodes and a pointer associated with the node ID.

21. The method according to claim 18, wherein:

a part of the third list is acquired by a sequential access using an index having one or more sets of data including the node ID of each of the nodes and the values included in the node;

a remainder of the third list is acquired by a random access using an index having one or more sets of data including the node ID of each of the nodes and the values included in the node and an index that stores sets of data including the node ID of each of the nodes and a pointer associated with the node ID; and the third list is acquired by switching between the sequential access and the random access.

22. A computer readable article of manufacture tangibly embodying computer readable instructions for executing a computer implemented method for aggregating data according to claim 9.

23. A computer readable article of manufacture tangibly embodying computer readable instructions for executing a computer implemented method for aggregating data according to claim 17.

* * * * *